(12) United States Patent
Mori et al.

(10) Patent No.: US 10,834,277 B2
(45) Date of Patent: Nov. 10, 2020

(54) IMAGE FORMING APPARATUS INCLUDING JOB END NOTIFICATION FUNCTION AND CONTROL METHOD THEREOF

(71) Applicant: SHARP KABUSHIKI KAISHA, Sakai (JP)

(72) Inventors: Harunobu Mori, Sakai (JP); Hirotoshi Ohkubo, Sakai (JP); Yoshikazu Kondoh, Sakai (JP); Sho Kamihisa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/569,112

(22) Filed: Sep. 12, 2019

(65) Prior Publication Data

US 2020/0092431 A1  Mar. 19, 2020

(30) Foreign Application Priority Data

Sep. 14, 2018 (JP) ................. 2018-172605

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ..... *H04N 1/00477* (2013.01); *H04N 1/00936* (2013.01); *H04N 2201/0094* (2013.01)

(58) Field of Classification Search
CPC .......... H04N 1/00477; H04N 1/00936; H04N 2201/0094
USPC ............... 358/1.1, 1.13, 1.14, 1.15, 1.6, 1.11
See application file for complete search history.

(56) References Cited

U.S. PATENT DOCUMENTS

| | | | |
|---|---|---|---|
| 2014/0029041 A1* | 1/2014 | Okubo ................ | H04N 1/4433 358/1.14 |
| 2015/0077777 A1* | 3/2015 | Hayakawa ......... | H04N 1/00448 358/1.13 |
| 2018/0249019 A1* | 8/2018 | Owens ............... | H04N 1/00015 |
| 2019/0104219 A1* | 4/2019 | Morita ................ | H04N 1/0022 |
| 2019/0281184 A1* | 9/2019 | Suzuki ............... | H04N 1/32352 |

FOREIGN PATENT DOCUMENTS

JP  H11-119600 A  4/1994

* cited by examiner

*Primary Examiner* — Douglas Q Tran
(74) *Attorney, Agent, or Firm* — ScienBiziP, P.C.

(57) ABSTRACT

An image forming apparatus including: an image processor that executes a job; a setting receiver that receives a setting relating to the job; a job controller that receives an execution request relating to a job predetermined for execution of a job relating to one function and causes the image processor to execute the job relating to the one function; a notifier that notifies a user of an end of each of the plurality of jobs; and a notification controller that determines whether to cause the notifier to notify the end of each of the plurality of jobs on the basis of at least one of a setting relating to each of the plurality of jobs and an attribute of an image to be processed.

11 Claims, 14 Drawing Sheets

IMAGE FORMING APPARATUS INCLUDING JOB END NOTIFICATION FUNCTION AND CONTROL METHOD THEREOF

BACKGROUND OF THE INVENTION

Field of the Invention

The present invention relates to an image forming apparatus including a print end notification function and a control method thereof.

Description of the Background Art

In image forming apparatuses such as copying machines, facsimiles, and printers, it is known to notify a user by light or sound when it is necessary to take the user's hand for continuation. For example, notification is performed when a job such as printing that is executed on the basis of an instruction from a user or an external device is completed. Alternatively, notification is performed when a document jams or a print sheet runs out during execution of a job. Moreover, it is known that a user can set whether to perform print end notification for each job to be executed (see, for example, Japanese Unexamined Patent Application Publication No. 11-119600).

For example, there is known a copier job provided with a function (so-called "test copy") for performing test printing on only a part of copies or only a part of pages in order to check the printing result. There is also known a printer job provided with a function for performing similar test printing (so-called "test printing"). Hereinafter, in this specification, functions of "test copy" and "test printing" are collectively referred to as "test printing".

The copier job, printer job or the like executed with the use of the test printing function is divided into a copier job and a printer job that relate to test printing and a copier job and a printer job that relate to real printing executed after the user confirms a result of the test printing and executed. That is, the test printing function is implemented by executing a plurality of jobs of a job relating to the test printing and a job relating to the real printing. Here, the job is a series of processes executed for one execution request received from a user or a external device, and refers to a process relating to image formation as a scanner, printer, or copier.

In the test printing function, test printing is first executed in response to an execution request of a job relating to the test printing. After a user confirms a result of the test printing, the user changes settings and repeats the test printing, or the user determines whether to perform real printing, and thus it is necessary to receive an execution request of a job relating to real printing separately from the execution request of the job relating to the aforementioned test printing. There are other cases in which one function is divided into a plurality of jobs and executed in an image forming apparatus, such as a test printing function. One example is a large-volume document reading function for copying a large number of documents exceeding the number of sheets that can be set in a document feeder at one time. When the large-volume document reading function is set, the document feeder is caused to read the documents set being divided into a plurality of bundles. Then, the documents which have been divided into the respective bundles and read are collectively treated as one volume of documents, and are collectively output. The user inputs an operation for setting a document for each bundle and requesting execution of a job relating to reading. In addition, after the last bundle of documents is read, the user also inputs an operation for instructing to start a collective output.

Here, in the large-volume document reading function, although the type of job is copy as a whole, the job relating to document reading of each time does not involve printing and thus is common with a scanner job. The subsequent job relating to a collective output does not involve document reading and thus is common with a printer job. As described above, there is also an aspect in which the copier job is divided into a scanner job and a printer job and executed.

As described above, it is not easy for the user to manually set individually whether to notify the end of each job in a job that receives a plurality of execution requests and completes one function. The present invention has been made to solve the above problems, and an object of the present invention is to provide an image forming apparatus that determines whether to notify the end of each job when one function is divided into a plurality of jobs and executed, and a control method thereof.

SUMMARY OF THE INVENTION

This invention provides (1) an image forming apparatus including: an image processor that can at least execute either a printer job as a printer or a copier job as a copier; a setting receiver that receives a setting by a user of a test printing function for confirming a finish; a job controller that receives an execution request of a job relating to test printing of the printer job or the copier job and causes the image processor to execute test printing on the basis of the set test printing function, and further receives an execution request of a job relating to real printing and causes the image processor to execute real printing; a notifier that notifies the user of ends of the job relating to the test printing and the job relating to the real printing; and a notification controller that controls whether to cause the notifier to notify the end of the job relating to the test printing and the end of the job relating to the real printing respectively on the basis of at least one of the setting relating to the printer job or the copier job and an attribute of an image to be processed.

The present invention further provides (2) an image forming apparatus including: an image processor that can execute at least either a scanner job as a scanner or a copier job; a document conveyer for sequentially feeding each document in such a manner that the image processor reads a plurality of documents set by a user; a setting receiver that receives a setting by the user of a large-volume document reading function that treats, documents set in the document conveyer in multiple tires and read by the image processor, as one volume of documents anal collectively outputs the documents; a job controller that receives an execution request of a job relating to document reading of each time, causes the document conveyer to feed the set documents, causes the image processor to read the fed documents, and further receives an execution request of a job relating to an output, and collectively outputs the documents read in multiple times; a notifier that notifies the user of ends of the job relating to the document reading and the job relating to the output; and a notification controller that controls whether to cause the notifier to notify the end of the job relating to the document reading of each time and the end of the job relating to the output on the basis of at least one of the setting relating to a job including the large-volume document reading function and the attribute of the image to be processed.

Furthermore, the present invention provides (3) image forming apparatus including: an image processor that executes a job of at least one type of scan, print, and copy; a setting receiver that receives a setting relating to the job by a user; a job controller that receives an execution request relating to a plurality of jobs of a same type or different types predetermined for execution of a job relating to one function and causes the image processor to execute the job relating to the one function; a notifier that notifies the user of an end of each of the plurality of jobs; and a notification controller that determines whether to cause the notifier to notify the end of each of the plurality of jobs on the basis of at least one of a setting relating to each of the plurality of jobs and an attribute of an image to be processed.

In addition, from a different point of view, the present invention provides (4) a control method of an image forming apparatus, in which a computer controlling an image processor includes: receiving a setting by a user of a test printing function for confirming a finish; receiving an execution request of a job relating to test printing of a printer job or a copier job and causing the image processor to execute test printing on the basis of the set test printing function; receiving an execution request of a job relating to real printing and causing the image processor to execute real printing; and determining whether to respectively notify the user of an end of the job relating to the test printing and an end of the job relating to the real printing on the basis of at least one of the setting relating to the printer job or the copier job and an attribute of an image to be processed.

The present invention further provides (5) a control method of an image forming apparatus, in which a computer controlling an image processor includes: receiving a setting by a user of a large-volume document reading function that treats, documents set in a document conveyer in multiple times and read by the image processor, as one volume of documents and collectively outputs the documents; receiving an execution request of a job relating to document reading of each time, causing the document conveyer to feed the set documents, and causing the image processor to read the fed documents; receiving an execution request of a job relating to an output and collectively outputting the documents read in multiple times; and determining whether to notify the user of an end of the job relating to the document reading of each time and an end of the job relating to the output on the basis of at least one of a setting relating to a job including the large-volume document reading function and an attribute of an image to be processed.

Furthermore, the present invention provides (6) a control method of an image forming apparatus, in which a computer controlling an image processor includes: receiving a setting by a user relating to a job of at least one type of scan, print, and copy; receiving an execution request relating to a plurality of jobs of a same type or different types predetermined for execution of a job relating to one function and causing the image processor to execute the job relating to the one function; and determining whether to notify the user of an end of each of the plurality of jobs on the basis of at least one of a setting relating to each of the plurality of jobs and an attribute of an image to be processed.

The image forming apparatus according to the present invention includes: (1) a job controller that receives an execution request of a job relating to test printing and causes an image processor to execute test printing, and further receives an execution request of a job relating to real printing and causes the image processor to execute real printing; and a notification controller that controls whether to cause a notifier to respectively notify an end of the job relating to the test printing and end of the job relating to the real printing on the basis of at least one of a setting relating to a job and an attribute of an image to be processed. Therefore, in a test printing function in which one function is divided into a job relating to test printing and a job relating to real printing and executed, it is possible to determine whether to notify the end of each job. Manually setting the necessity of the notification regarding the end of the test printing and the necessity of the notification regarding the end of the real printing imposes a burden of a complicated operation the user, while unnecessary notifications are not always comfortable for the user. According to the present invention, since the notification controller determines the necessity of the notification regarding the end of the job according to the situation, the user does not have to perform a complicated operation, and only the necessary notifications are provided. The same applies to the invention according to (4) above.

The image forming apparatus according to the present invention includes: (2) a job controller that receives an execution request of a job relating to document reading, causes the document conveyer to feed set documents, causes an image processor to read the fed documents, and further receives an execution request of a job relating to an output, and collectively outputs the documents read in multiple times; and a notification controller that controls whether to cause the notifier to notify the end of the job relating to the document reading and the end of the job relating to the output on the basis of at least one of the setting relating to a job including a large-volume document reading function and an attribute of an image to be processed. Therefore, in a large-volume document reading function in which one function is divided into a job relating to document reading and a job relating to outputting and executed, it is possible to determine whether to notify the end of each job. Manually setting the necessity of the notification regarding the end of the document reading and the necessity of the notification regarding the end of the outputting imposes a burden of a complicated operation on the user, while unnecessary notifications are not always comfortable for the user. According to the present invention, since the notification controller determines the necessity of the notification regarding the end of the job according to the situation, the user does not have to perform a complicated operation, and only the necessary notifications are provided. The same applies to the invention according to (5) above.

The image forming apparatus according to the present invention includes: (3) a job controller that receives an execution request relating to a plurality of jobs of a same type or different types predetermined for execution of a job relating to one function and causes an image processor to execute the job relating to the one function; and a notification controller that determines whether to cause a notifier to notify the end of each of the plurality of jobs on the basis of at least one of a setting relating to a job and an attribute of an image to be processed. Therefore, when one function divided into a plurality of jobs and executed, it is possible to determine whether to notify the end of each of the plurality of jobs. According to the present invention, since the notification controller determines the necessity of the notification regarding the end of the job according to the situation, the user does not have to perform a complicated operation, and only the necessary notifications are provided. The same applies to the invention according to (6) above.

DESCRIPTION OF THE PREFERRED EMBODIMENTS

Hereinafter, the present invention will be described in more detail with the use of the drawings. The following description is an exemplification in all respects and should not be construed as limiting the present invention.

Embodiment 1

Configuration Example of Image Forming Apparatus

Figure 1:
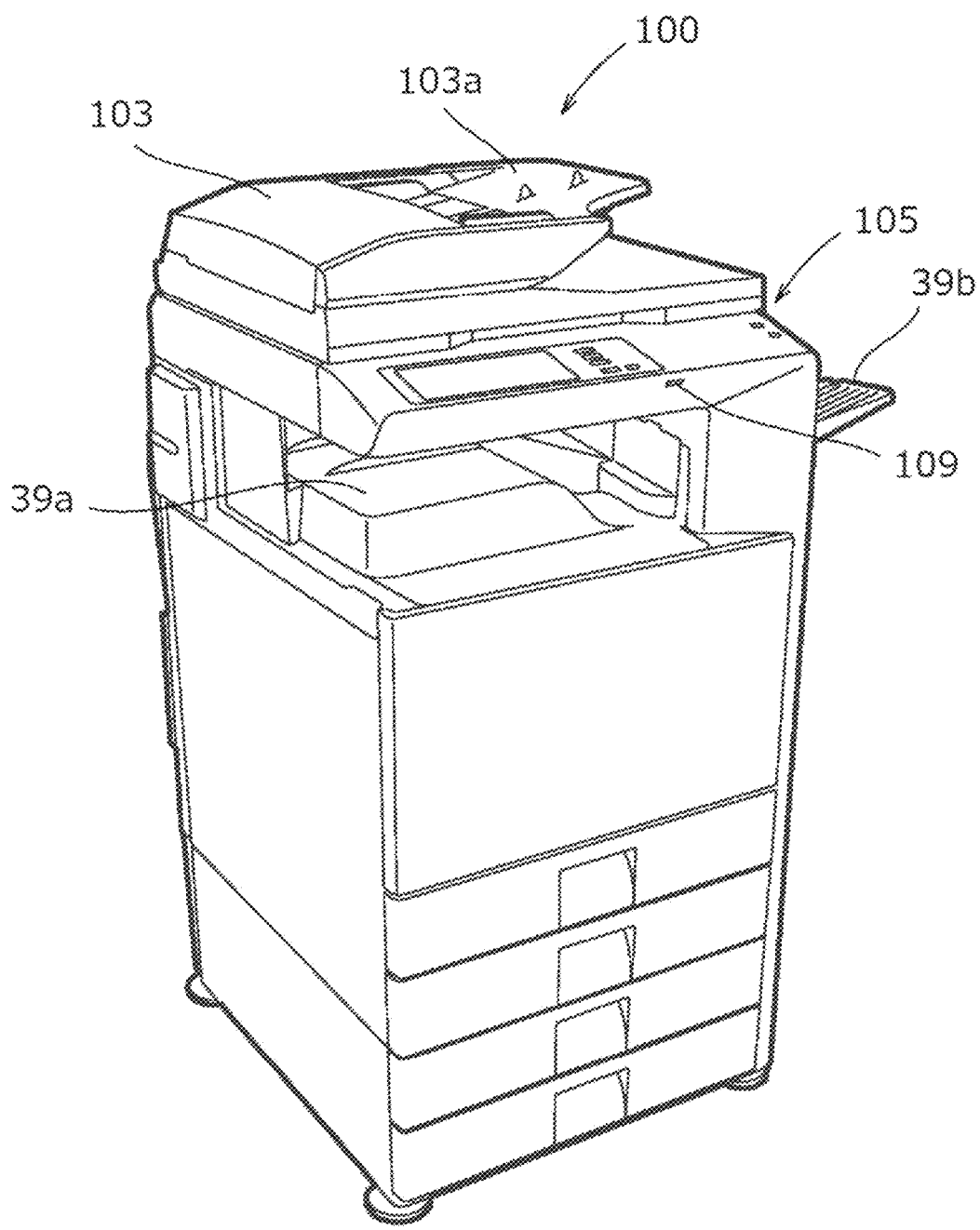
FIG. 1 is a perspective view illustrating an appearance of a digital multi-function peripheral which is an embodiment of an image forming apparatus of the present invention.
Figure 2:
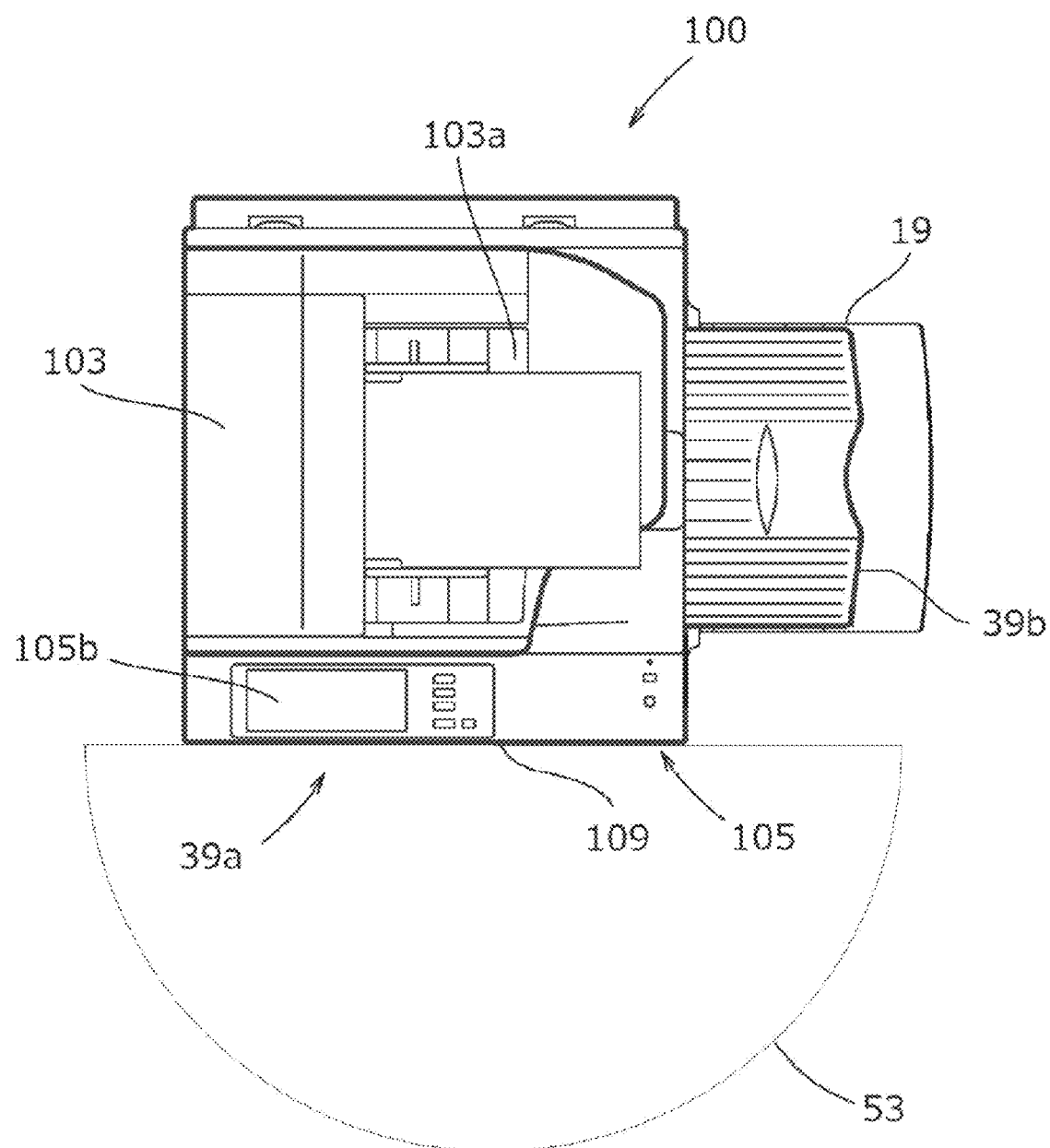
FIG. 2 is a plan view of the digital multi-function peripheral illustrated in FIG. 1.
Figure 3:
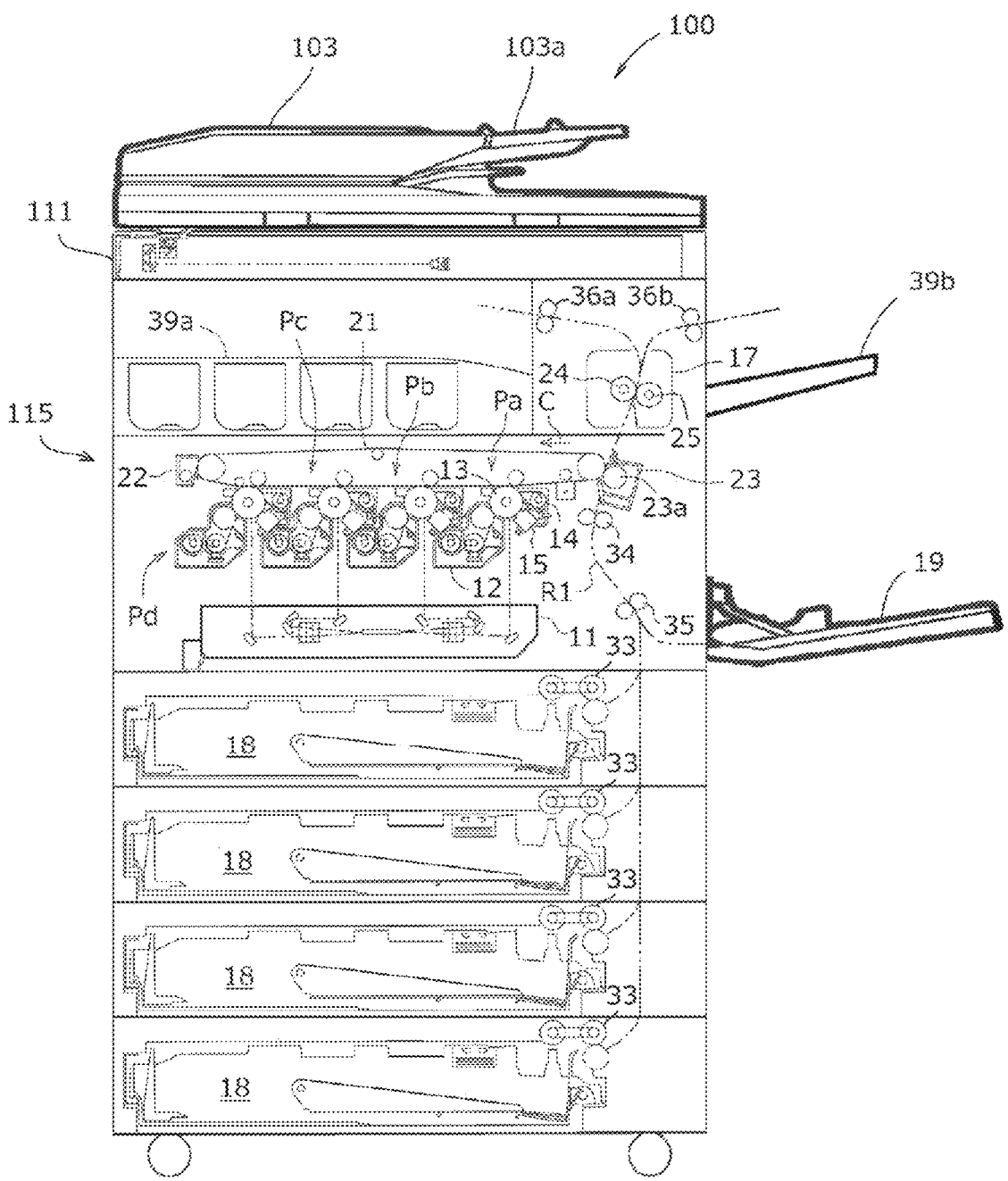
FIG. 3 is a cross-sectional view illustrating a mechanical configuration of a main body portion of the digital multi-function peripheral illustrated in FIG. 1.

FIG. 1 is a perspective view illustrating an appearance of a digital multi-function peripheral which is an embodiment of an image forming apparatus of the present invention. FIG. 2 is a plan view the digital multi-function peripheral illustrated in FIG. 1. FIG. 3 is a cross-sectional view illustrating a mechanical configuration of a main body portion of a digital multi-function peripheral 100 illustrated in FIG. 1. As illustrated in FIG. 1 and FIG. 2, the digital multi-function peripheral 100 includes a document conveyer 103, a human body sensor 109, and ejection trays 39a and 39b.

As illustrated in FIG. 3, the digital multifunction peripheral 100 includes an image reading device 111 that reads a document, a document conveyer 103 that conveys a document to a reader, and an image forming device 115 that forms an image. The digital multi-function peripheral 100 executes a job of scan, print, and copy on the basis of an instruction from a user received via the document conveyer 103 and a communication interface (not illustrated in FIGS. 1 and 2).

Here, an internal configuration of the digital multi-function peripheral 100 illustrated in FIG. 3 will be briefly described. In the digital multi-function peripheral 100, a color image using each color of black (K), cyan (C), magenta (M), and yellow (Y) is printed on a print sheet. Alternatively, a monochrome image using a single color (for example, black) is printed on the print sheet. For this reason, four developing devices 12, four photosensitive drums 13, four drum cleaning devices 14, and four chargers 15, and the like are provided respectively. Four image stations Pa, Pb, Pc, and Pd are configured in correspondence with black, cyan, magenta, and yellow, respectively, in order to form four types of toner images corresponding to the respective colors.

A toner image is formed as follows at each of the image stations Pa, Pb, Pc, and Pd. The drum cleaning device 14 removes and collects residual toner on a surface of the photosensitive drum 13. After that, the charger 15 uniformly charges the surface of the photosensitive drum 13 to a predetermined potential. Then, a light scanning device 11 exposes the uniformly charged surface to form an electrostatic latent image on the surface. After that, the developing device 12 develops the electrostatic latent image. The toner image of each color is thereby formed on the surface of each photosensitive drum 13. An intermediate transfer belt 21 circumferentially moves in an arrow direction C. A belt cleaning device 22 removes and collects residual toner on the circumferentially moving intermediate transfer belt 21. The toner image of each color formed on the surface of each photosensitive drum 13 is sequentially transferred to and superimposed on the intermediate transfer belt 21, and a color toner image is formed on the intermediate transfer belt 21.

The print sheet is pulled out from any one of four feeding trays 18 by a pickup roller 33 and fed to a secondary transfer device 23 through a sheet conveyance path R1. Alternatively, the print sheet is fed from a manual feeding tray 19 by a pickup roller (not illustrated) and fed to the secondary transfer device 23 through the sheet conveyance path R1. A registration roller 34 is disposed in the sheet conveyance path R1 to temporarily stop the print sheet and align a leading end of the print sheet. In addition, a conveyance roller 35 or the like is disposed to promote conveyance of the print sheet. After temporarily stopping the print sheet, the registration roller 34 conveys the print sheet to a nip area nipped between the intermediate transfer belt 21 and a transfer roller 23a in accordance with a transfer timing of the toner image.

A nip area is formed between the transfer roller 23a of the secondary transfer device 23 and the intermediate transfer belt 21. When the print sheet passes through the nip area, a color toner image formed on the surface of the intermediate transfer belt 21 is transferred to the print sheet. After passing through the nip area, the print sheet is sandwiched between a heating roller 24 and a pressure roller 25 of a fixing device 17 to be heated and pressurized. The color toner image is fixed on the print sheet by the heating and the pressure. The print sheet having passed through the fixing device 17 is ejected to the ejection tray 39a or 39b through an ejection roller 36a or 36b. The ejection destination of the print sheet is controlled by a controller 101 described later, and a conveyance path is switched in such a manner that the print sheet is guided to any of the ejection trays 39a and 39b by a switching mechanism (not illustrated). The switching mechanism of the print sheet conveyance path is not illustrated in detail because it is well know the technical field of image forming apparatuses.

Figure 4:
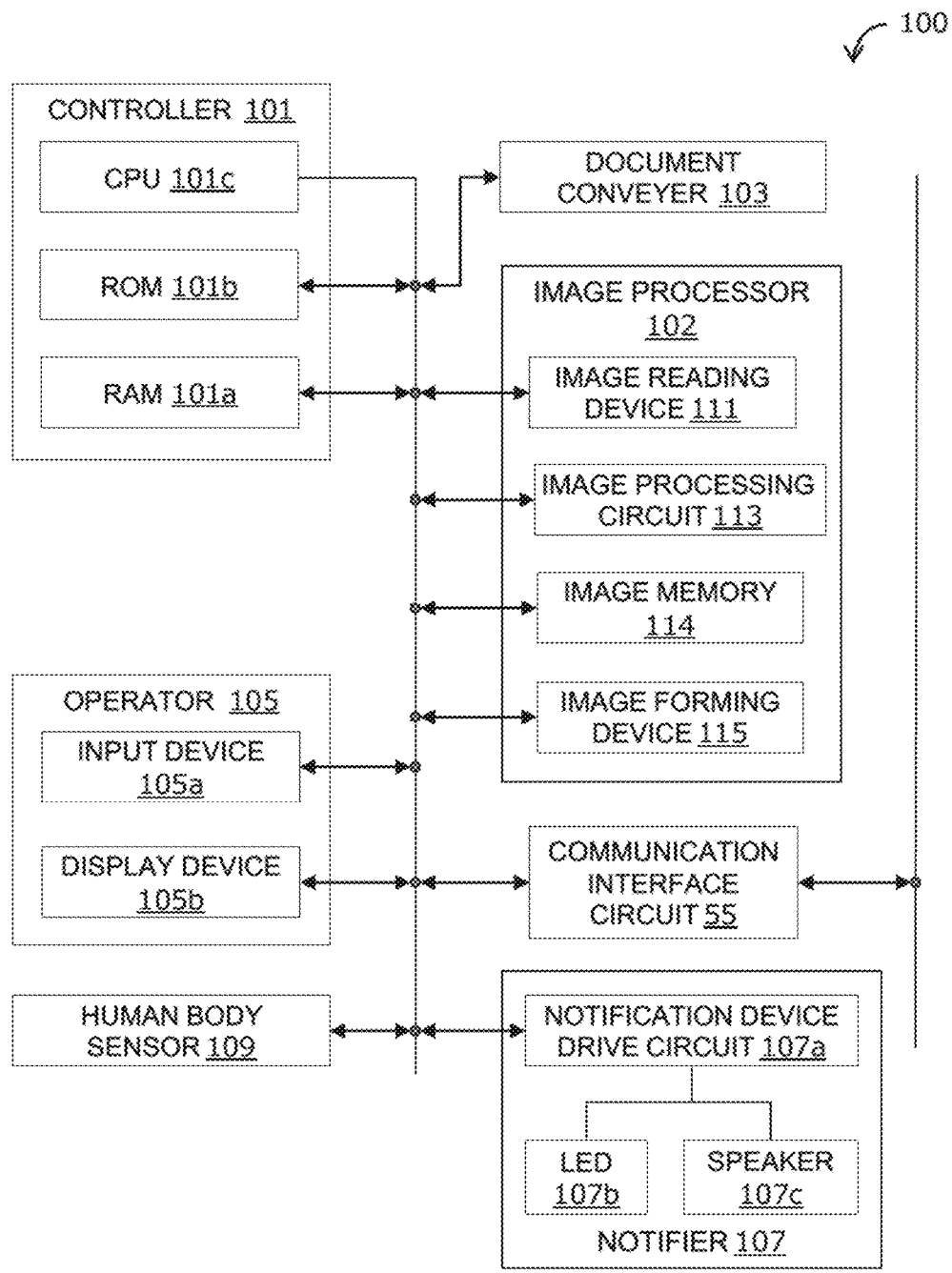
FIG. 4 is a block diagram illustrating an electrical configuration of the digital multi-function peripheral illustrated in FIG. 1.

Subsequently, an electrical configuration of the digital multi-function peripheral 100 will be briefly described. FIG. 4 is a block diagram illustrating an electrical configuration of the digital multi-function peripheral 100 of this embodiment. As illustrated in FIG. 4, the digital multi-function peripheral 100 includes a controller 101, an image processor 102, the document conveyer 103, an operator 105, a notifier 107, and a human body sensor 109. In FIG. 4 the controller 101 integrally controls the digital multi-function peripheral 100, and includes a CPU 101c, a ROM 101b, a RAM 101a, various interface circuits, and the like. The controller 101 includes functions of a setting receiver, a job controller, and a notification controller. The controller 101 manages job execution based on an operation received by the operator 105 and job execution based on an instruction received from an external device via a communication interface circuit 55. In addition, the controller 101 controls the image processor 102, the notifier 107, and the human body sensor 109.

The image processor 102 includes an image reading device 111, an image processing circuit 113, an image memory 114, and an image forming device 115, and performs a process relating to input and output of image data. The controller 101 controls the image processor 102. The image reading device 111 includes a mechanism that scans a document, a sensor that reads an image of the scanned document, and a drive circuit thereof. The document conveyer 103 is a mechanism and a circuit that conveys a document set on the document tray 103a sheet by sheet and causes the image reading device 111 to read the document. The image processing circuit 113 is a circuit that adjusts and edits an image of a document read by the image reading device 111. In addition, the image processing circuit 113 is a circuit that converts print data received via the communication interface circuit 55 into image data, and adjusts and edits it.

The image memory 114 is, for example, a storage such as a hard disk drive (HDD) or a flash memory, and stores image data of a document read by the image reading device 111 or print data received from an external device via the communication interface circuit 55. The image forming device 115 includes a mechanism and a circuit for printing a print image on a print sheet by an electrophotographic method. The image forming device 115 is configured including electrical components relating to the light scanning device 11, the developing device 12, the photosensitive drum 13, the drum cleaning device 14, and the charger 15 in FIG. 3. In addition, the image forming device 115 is configured including electrical components relating to the intermediate transfer belt 21, the fixing device 17, the sheet conveyance path R1, the feeding tray 18, and the ejection trays 39a and 39b.

The communication interface circuit 55 transmits and receives communication data to and from an external device, and for example, receives print data from an external computer, and receives an execution request of a printer job. The notifier 107 notifies a user of the completion of a job, and includes a notification device drive circuit 107a, an LED 107b, and a speaker 107c. Notification is performed by means of at least one of the light of the LED 107b and the sound from the speaker 107c. In addition, a notification may be sent to an external device communicably connected via the communication interface circuit 55. The operator 105 includes an input device 105a including a key and a touch panel, and a display device 105b including a liquid crystal display device. The human body sensor 109 senses that the user is within a predetermined range from the operator 105.

In FIG. 2, a semicircular sensing area 53 indicates an area where the human body sensor 109 senses a human body. When the user enters the sensing area 53, the human body sensor 109 senses the user. The human body sensor 109 detects an approximate distance to a sensed human body. An infrared sensor, an ultrasonic sensor, a pyroelectric sensor, or the like can be applied as the human body sensor 109. In addition, an aspect; in which a face recognition process is performed using an imaging device is also conceivable. When a person is recognized with the use of the face recognition process, a more advanced determination may be made as well as detection of an unspecified person. For example, when a person is detected at the end of a job relating to test printing or real printing, it may be identified whether the same person as the job start time is detected, and if different, notification may be given to the user as is the case with not detecting a person.

For example, the controller 101 controls the document 3 conveyer to convey the document by the document conveyer 103. Then, the image reading device 111 is caused to read the image of the document, and the image processor 102 is controlled to adjust the read image data. Then, the image data indicating the image of the document is stored in the image memory 114. In addition, the image data in the image memory 114 or the image indicated by the received print data is printed on a print sheet. The above is the outline of the configuration of the digital multi-function peripheral 100.

End Notification in Test Printing Function

In this specification, the test printing function is a function that allows only one copy to be printed to check the finish before copying a set number of copies and the user can change the setting as needed. Alternatively, only pages set by the user may be printed out of the one copy. The test printing function is a function that can be set for a copier job and a printer job. In the copier job, the image data of the documents read until the copying of the set number of copies is completed is held in the image memory 114. In the printer job, the received print data or the image data obtained by developing same is held in the image memory 114. When the user who confirms the test printing changes the setting, it is not necessary to read the document and receive the print data again.

Figure 5:
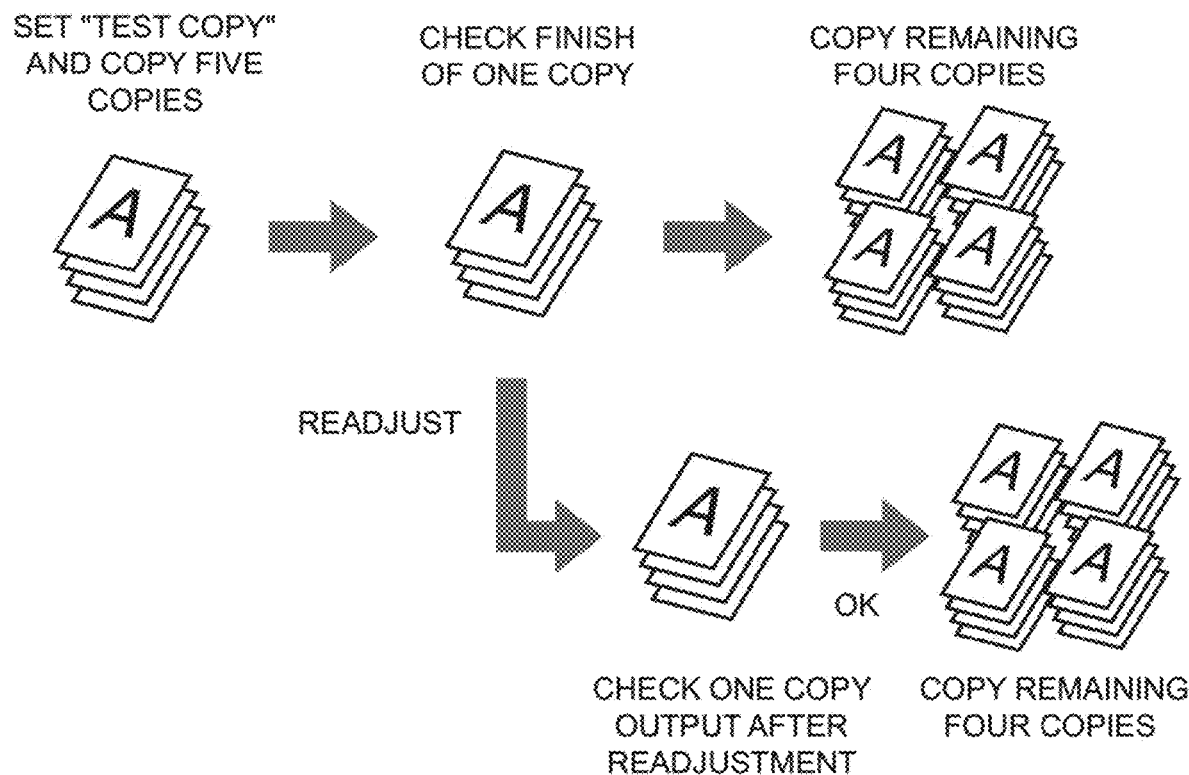
FIG. 5 is an explanatory diagram illustrating a flow of a copier job of a test printing function in this embodiment (embodiment 1).
Figure 6:
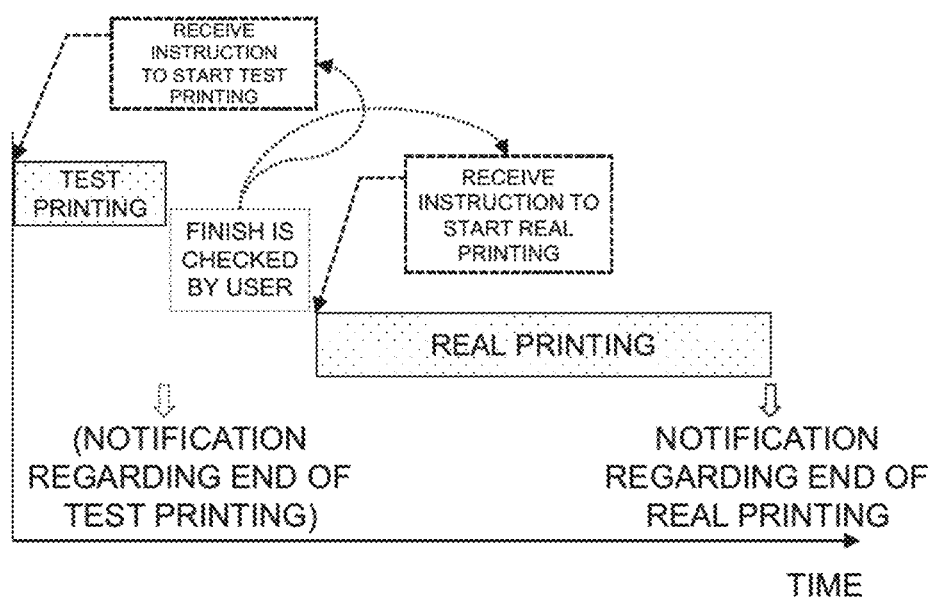
FIG. 6 is an explanatory diagram illustrating a configuration of a job of the test printing function in this embodiment (embodiment 1).
Figure 7:
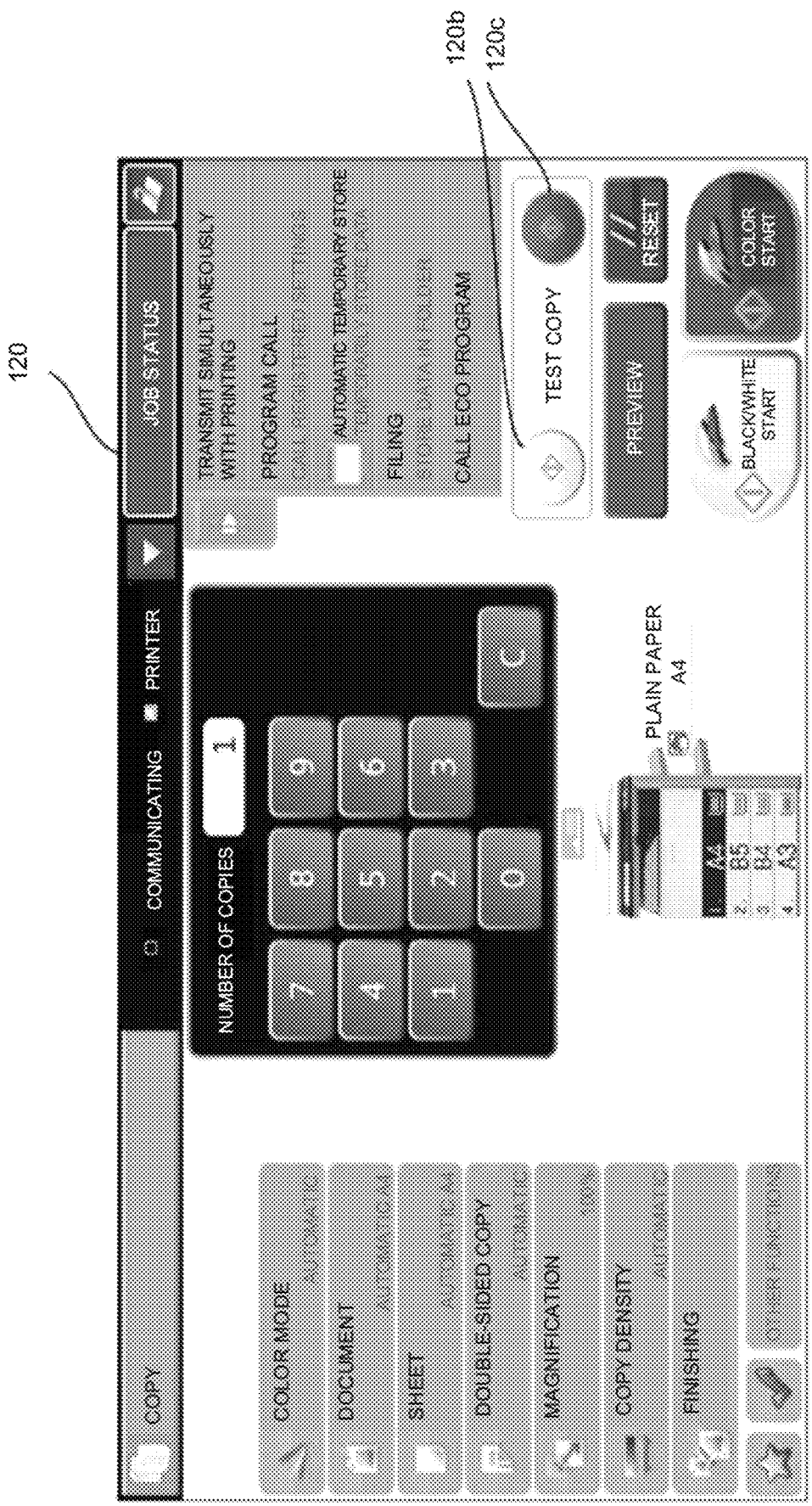
FIG. 7 is an explanatory diagram illustrating an example of an operation screen relating to the copier job in this embodiment (embodiment 1).
Figure 8:
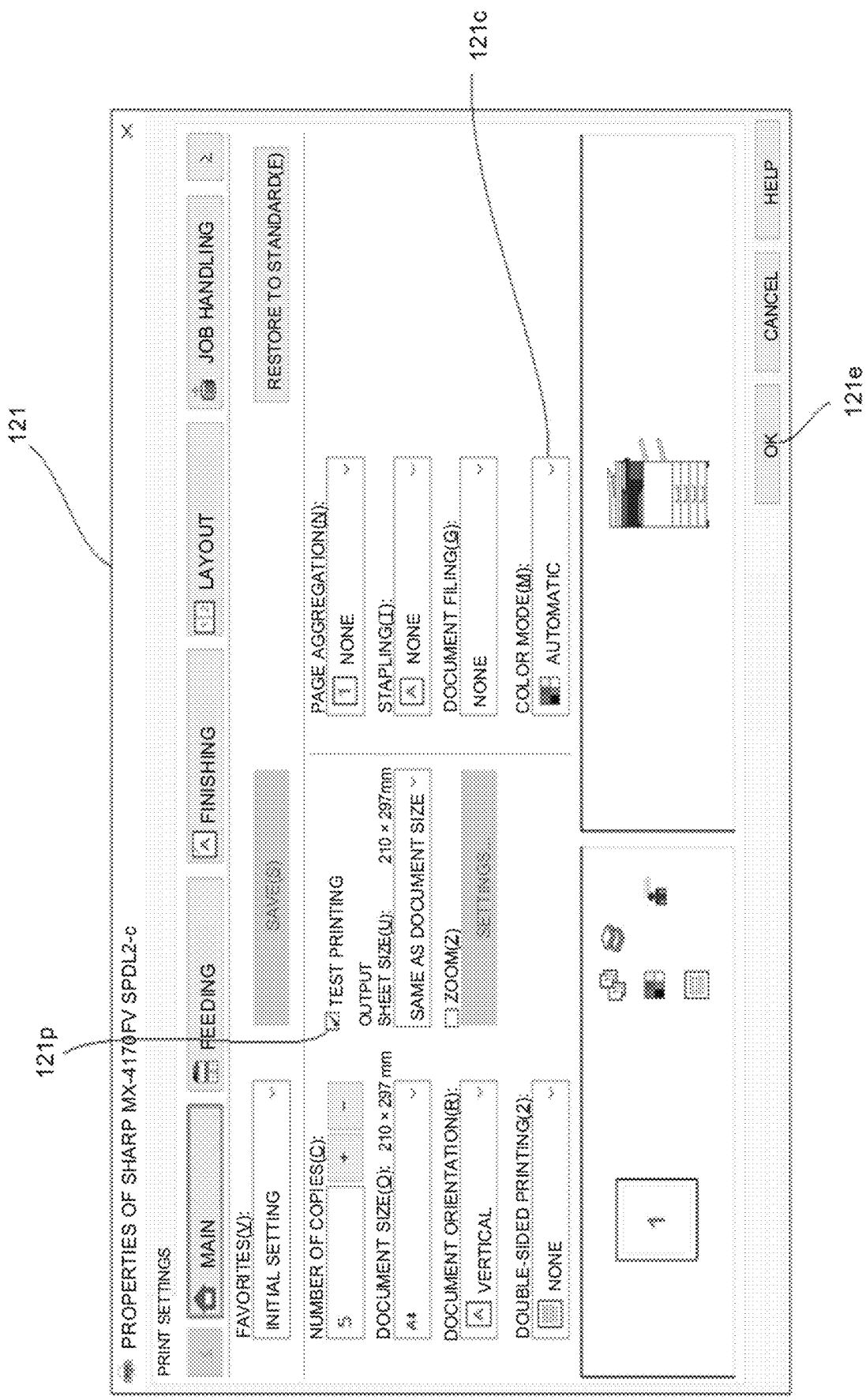
FIG. 8 is an explanatory diagram illustrating an example of a user interface screen relating to a print job in this embodiment (embodiment 1).

FIG. 5 is a explanatory diagram illustrating a flow of a copier job (test copy) using the test printing function as a specific example of the test printing function. FIG. 6 is an explanatory diagram illustrating a configuration of a job of the test printing function in this embodiment. As illustrated in FIG. 6, the test printing function includes a job relating to test printing and a job relating to real printing, and each job starts execution in response to a start instruction from the user. FIG. 7 is an explanatory diagram illustrating an example of an operation screen relating to a copier job in this embodiment. The operation screen illustrated in FIG. 7 is displayed on the display device 105b. Meanwhile, FIG. 8 is an explanatory diagram illustrating an example of a user interface screen relating to a printer job in this embodiment. The user interface screen relating to the printer job illustrated in FIG. 8 is displayed on an external computer communicably connected to the digital multi-function peripheral 100 via the communication interface circuit 55.

An example of a specific flow of the test copy will be described with reference to FIG. 5. On the operation screen of the copier job illustrated in FIG. 7, the user performs as needed a setting relating to a copier job including various functions with the use of buttons relating to various settings arranged on the left side. In addition, after a number of copies (five in the example illustrated in FIG. 5) is set with the use of a central numeric keypad, the user touches a "test copy" button 120b or 120c.

The controller 101 recognizes that a touch panel (corresponding to the input device 105a) disposed on the surface of the display device 105b on which the copier job operation screen illustrated in FIG. 7 is displayed detects the user's operation. There are two "test copy" buttons, and when the "test copy" button 120b is touched among them, the controller 101 executes test printing of black and white copy according to a job setting. When the button 120c is touched, the controller 101 executes test printing of color copy according to a job setting.

When a job relating to test printing ends, the controller 101 may notify the end of the test printing. However, it is also conceivable that the number of copies of the test printing is smaller than the number of real printing, and thus the job ends in a shorter period, and it is highly likely that the user does not leave the side of the operator 105 in order to confirm the finish of the test printing. Therefore, according to the most basic aspect of this embodiment, the controller 101 does not perform notification regarding the end of the test printing. However, as described later, an aspect is also conceivable in which the controller 101 determines whether to perform notification on the basis of various settings relating to the job.

The "receive instruction to start test printing" illustrated in FIG. 6 corresponds to a fact that the controller 101 recognizes that any "test copy" button has been touched. In response to the operation, the controller 101 starts a copier job relating to test printing (see FIG. 6). As illustrated in FIG. 5, only one copy pied in the test printing. The user checks the finish by the test printing, and changes the setting with the use of the operation screen illustrated in FIG. 7 if necessary. For example, a magnification may be changed, a copy density may be changed, or a setting relating to "other functions" may be changed. The test printing may be further repeated with the changed setting. In that case, in FIG. 6, the process returns to the beginning "receive instruction to start test printing". The test printing is not limited to the printing of one copy illustrated in FIG. 5, but the user may be able to set which page of the copy is to be used for test printing.

After the end of the job relating to the test printing, the user confirms the finish, changes a setting relating to the copier job, and can repeat the test printing with the changed settings, but can also start real printing. Those operations may be performed with the use of a user interface screen different from that of FIG. 7. The real printing corresponds to a job for punting the remaining four copies in the example of FIG. 5. The job relating to the real printing is common with the printer job in that printing is performed with the use of the image data held in the image memory 114 without reading a document. When the real printing ends, the controller 101 performs notification regarding the end of the real printing. According to one of the most basic aspects of this embodiment, the controller 101 performs notification regarding the end of the real printing. However, as described later, an aspect is also conceivable in which whether to perform notification is determined on the basis of various settings relating to a job. As described above, the test printing function includes one or more jobs relating to test printing and one job relating to real printing, and each job is started on the bass of the user's instruction. While the copier job has been described as an example, a similar test printing function may be provided for a printer job.

FIG. 8 is a printer job operation screen corresponding to FIG. 7. For example, when a print menu of application software is selected, the printer job operation screen illustrated in FIG. 8 is displayed. The user performs setting of functions and other settings relating to a printer job as needed with the use of the respective buttons arranged in an operation screen 121 illustrated in FIG. 8. For example, a setting of a color mode 121c is performed. In addition to that, settings are performed with the use of buttons of feeding, finishing, layout, and image quality adjustment (not illustrated). In addition, a setting relating to a printer job, such as setting the number of copies is performed. Then, in a state where a test printing check box 121p is checked, when an OK button 121e is clicked, print data is sent to the digital multi-function peripheral 100 together with information relating to the setting of a job. The controller 101 executes a printer job relating to test printing on the basis of the received information and the print data in a state where the image memory 114 holds same.

The printer job operation screen 121 continues to be displayed without disappearing even after the start of the test printing. The user who has confirmed the test printing can change a setting relating to the job, or can repeat the test printing with the changed content with the use of the displayed printer job operation screen 121. When real printing is performed, the check mark on the test print check box 121p is erased and then the OK button 121e is clicked. In the real printing, only the setting relating to the job may be transmitted to the digital multi-function peripheral 100 in response to the click on the OK button 121e, and the print data may not be transmitted. In addition, in response to the click on the OK button 121e, the printer job operation screen 121 is closed.

As described above, when the test printing function is set with the use of the test printing check box 121p, test printing is performed and the printer job operation screen 121 is held. In this state, when the check mark of the test print check box 121p is removed, real printing is performed. Meanwhile, when the OK button 121e is clicked without setting the test printing function, all the set number of copies are printed. The controller 101 executes a printer job relating to real printing with the use of the data held in the image memory 114 on the basis of the setting of the job for which the instruction to start the real printing has been received and the print data. The start of the real printing may be instructed with the use of the operator 105 instead of the operation screen illustrated in FIG. 8.

Flowchart

Figure 9:
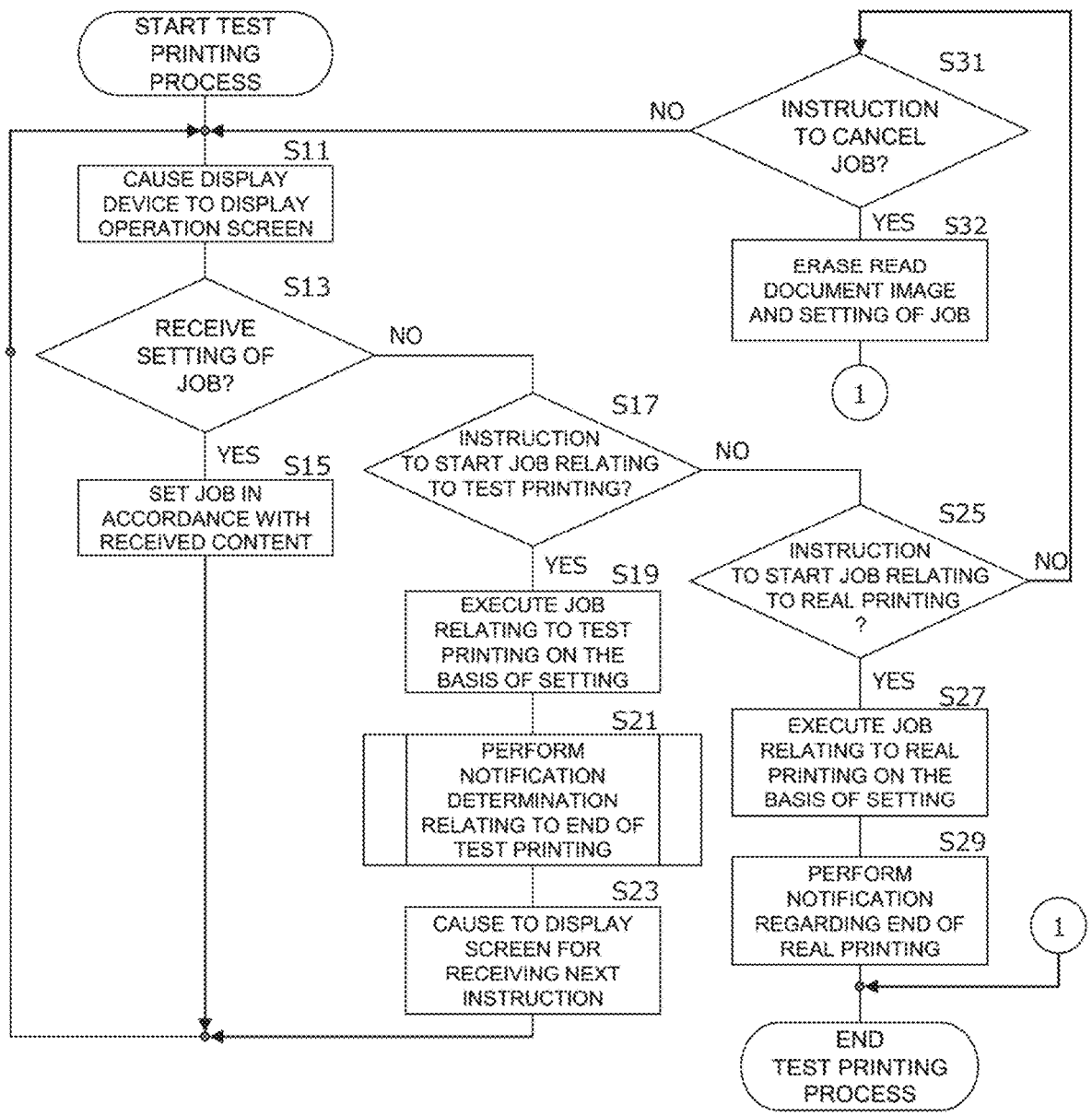
FIG. 9 is a flowchart illustrating a flow of a test printing process in this embodiment (embodiment 1).

A flow of a process of a job in which the test printing function has been set will be described with reference to a flowchart. FIG. 9 is a flowchart illustrating a flow of a test printing process in this embodiment. While a copier job is assumed, the flow is the same for a printer job and thus could be easily analogized from FIG. 9 by a person skilled in the art. In a printer job, the notifier 107 may transmit a packet representing a notification via the communication interface circuit 55 to a device that has transmitted the print data, as an alternative to or together with the notification by light and sound. The controller processes various other tasks in parallel (multitask processing). For example, the controller sequentially monitors a state of the document tray 103a of the document conveyer 103. Then, when a document is set by the user, a size of the document is detected, and the size of the document is displayed at a position of a "document" button of a copier job operation screen 120 displayed on the display device 105b. In addition, an icon indicating that the document has been set is displayed near an illustration representing the document conveyer 103. However, in FIG. 9, processes of other tasks are omitted.

As illustrated in FIG. 9, the controller 101 causes the display device 105b to display the copier job operation screen 120 (step S11), and receives an operation by the user relating to a setting of a copier job (step S13). Upon receipt of the setting operation (YES in the step S13), the controller 101 updates the content of the setting relating to the copier job in accordance with the received operation (step S15). Then, the routine returns to the process of the step S11. When the received operation is not a setting relating to a job (NO in the step S13) and the "test copy" button 120b or 120c is touched (YES in the step S17), the controller 101 executes a copier job relating to test printing in a mode according to a setting relating to a job (step S19). A copier job relating to a test printing of monochrome or color is executed in accordance with which of the "test copy" buttons 120b and 120c is touched.

When the copier job relating to the test printing ends, the controller 101 performs notification determination relating to the end of the test printing (step S21), and uses the notifier 107 to determine whether to notify the end of the test printing. Although the content of the process relating to the notification determination in the step S21 will be described later, depending on the situation, there are cases where the end notification is performed or not performed. In this respect, test printing differs from real printing that uniformly performs the end notification. In addition, the controller 101 causes the display device 105b to display a user interface screen for receiving a next instruction (step S23). Then, the routine returns to the process of the step S11.

If the received operation is not an instruction to start test printing (NO in the step S17) and is the instruction to start the job relating to the real printing on the screen displayed in the step S23 (YES in step S25), the controller 101 executes a copier job relating to the real printing in a mode according to a setting relating to a job (step S27). When the copier job relating to the real printing ends, the notifier 107 is used to notify the end of the copier job relating to the real printing (step S29). Then, a series of jobs related to the test copy ends.

In the step S25, if the instruction from the user is not the instruction to start the job relating to the real printing (NO in the step S25), the controller 101 determines whether an instruction to cancel the job has been received (step S31). When the instruction to cancel the job has been received (YES in the step S31), the controller 101 erases the image of the document read and stored in the image memory 114 and the setting relating to the job (step S32), and ends a series of jobs relating to the test copy.

In the step S31, if the instruction from the user is not an instruction to cancel the job (NO in the step S31) the routine returns to the aforementioned step S11 and waits for an instruction from the user.

The following modification may also be considered. In the step S29, when a copy job relating to the real printing ends, the end notification is uniformly performed. Alternatively, if the number of copies or the number of prints relating to the real printing is smaller than a predetermined value, it is determined that a time from the start to the end of the copier job relating to the real printing is short. In that case, it is highly likely that the user is not away from the side of the operator 105 and the notification regarding the end of the real printing is not performed. Meanwhile, if the number of copies or the number of prints relating to the real printing is equal to or more than the aforementioned value, the notification regarding the end of the real printing is performed. In addition, as another modification, the controller 101 determines whether the digital multi-function peripheral 100 is a model including a human body sensor 109 illustrated in FIG. 4, and in the case of a model including the human body sensor 109, the controller 101 determines whether the human body sensor 109 has detected a person in the sensing area 53. As a result, when the human body sensor 109 has not detected a person, it is determined that the user who instructed the real printing is not near the operator 105, and the notification regarding the end of the real printing is performed. Meanwhile, when the human body sensor 109 has detected a person, the notification regarding the end of the real printing is not performed. FIG. 9 illustrates only the flow of a series of jobs relating to test copy. In addition to that, for example, when the "black/white start" button or the "color start" button is touched on the copier job operation screen 120, although the controller 101 executes a normal copier job that copies a set number of copies at one time, such other flows are omitted.

Figure 10:
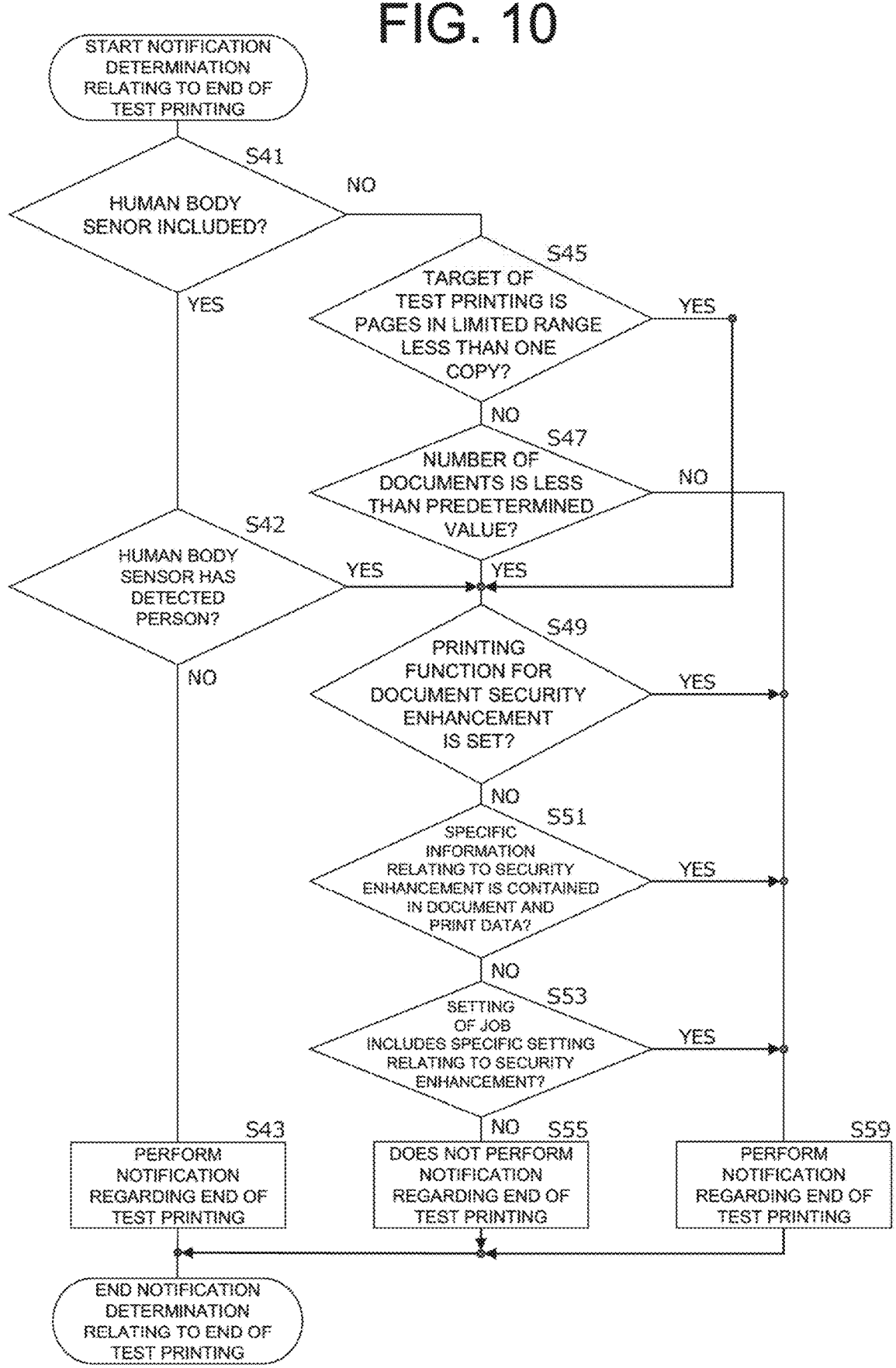
FIG. 10 is a flowchart illustrating a process of notification determination relating to an end of the test printing in the flowchart of FIG. 9 (embodiment 1).

Subsequently, the content of the notification determination process relating to the end of the test printing in the step S21 will be described. As a simple notification determination aspect, an aspect may be considered in which when the test printing ends, the user is likely to be nearby to confirm the finish and the notification is not performed, and when a job relating to the real printing ends, the notification is performed. In this embodiment, an aspect of making more complicated condition determination will be described. FIG. 10 is a flowchart illustrating a process of notification determination relating to the end of the test printing in the flowchart of FIG. 9. As illustrated in FIG. 10, the controller 101 determines whether the digital multi-function peripheral 100 is a model including a human body sensor 109 illustrated in FIG. 4 (step S41). In the case of a model including the human body sensor 109 (YES in the step S41), it is further determined whether the human body sensor 109 has detected a person in the sensing area 53 (step S42).

As a result, when the human body sensor 109 has not detected a person (NO in the step S42), it is determined that the user who has instructed the test printing is not near the operator 105, and the notification regarding the end of the test printing is performed (step S43). Meanwhile, when the human body sensor 109 has detected a person (YES in the step S42), the end notification is not basically performed, but if a function relating to security is set, the end notification is performed with caution. For this determination, the routine proceeds to the following step S49. Meanwhile in the step S41, in the case of a model not including the human body sensor 109 (NO in the step S41), it is further determined as follows whether the notification regarding the end of the test printing is to be performed on the basis of the number of pages of the test printing or the number of documents relating to the copier job of the test printing. The controller 101 determines whether a target of the test printing is set through one copy or set as pages in a limited range less than one copy (step S45).

If the target of the test printing is not set to pages in the range less than one copy (NO in the step S45), it is determined that it takes a corresponding amount of time to perform the test printing through one copy. In that case, the user is supposed to leave the side of the operator 105 by the end of the test printing, and basically, notification regarding the end of the test printing is performed. However, before determining to notify, the number of documents constituting one copy may be further determined. That is, the controller 101 determines whether the number of documents constituting one copy is less than a predetermined value (step S47). If the number of documents is equal to or more than the predetermined value (NO in the step S47), it is determined that it has taken time to read all the documents and finish printing one copy after the start of the test printing. The user is supposed to leave the side of the operator 105 between the start and end of the test printing, and the notification regarding the end of the test printing is performed (step S59). Meanwhile, if the number of documents constituting one copy is less than the predetermined value (YES in the step S47), the end notification is basically not performed. However, if a function relating to security is set, the end notification is performed with caution. For this determination, the routine proceeds to step S49 described later.

In addition, in the step S45, also when the test printing is set to pages in a range less than one copy (YES in the step S45), it is determined that the time required from the start to the end of the test printing is short. In that case, it is highly likely that the user is not away from the side of the operator 105, and basically, the notification regarding the end of the test printing is not performed. However, if a function relating to security is set, the end notification is performed with caution. For this determination, the routine proceeds to step S49 described later. In addition, it is determined whether the number of pages for the test printing or the number of read documents is less than a predetermined value, and if the number is equal to or more than the predetermined value, it is determined that it has taken time to read all the documents and finish the test printing after the start of the test printing, and the user is supposed to leave the side of the operator 105 between the start and end of the test printing, and the notification regarding the end of the test printing may be performed.

As a determination as to whether a function relating to security is set, the controller 101 first determines whether, for example, a function for superimposing a tint block, a tracking pattern, or a stamp pattern on an image of a document to enhance document security and printing is set (step S49). If a superimposed printing function for document security enhancement is not set (NO in the step S49), the routine proceeds to step S51 described later to determine whether another function relating to security is set. Meanwhile, if the superimposed printing function is set (YES in the step S49), the routine proceeds to step S59, and the notification regarding the end of the test printing is performed.

Here, the tint block is to embed characters such as fixed texts and input characters for preventing unauthorized copying in a background pattern (tint block). When a document with the tint block printed on it is copied, hidden characters appear. In addition, the tracking pattern s to forcibly add and print traceable information set in advance by a user in order to prevent a copy from being used illegally. The tracking pattern is printed outside an image frame, and examples of the information to be added are a user account for using a digital multi-function peripheral, and a date and a time when copying was performed. The stamp pattern for document security enhancement is, for example, a fixed pattern such as "confidential," "copy prohibited," or the like.

As the next determination as to whether a function relating to security is set, the controller 101 determines whether the document or print data contains specific information relating to document security enhancement (step S51). If specific information relating to document security enhancement is not contained (NO in the step S51), the routine proceeds to step S53 described later to determine whether another function relating to security is set. Meanwhile, if information relating to document security enhancement is set (YES in the step 51), the routine proceeds to step S59, and the notification regarding the end of the test printing is performed.

Here, the specific information relating to document security is information of a preset pattern, and is information relating to personal information (for example, an address, a telephone number, an e-mail address, a date of birth, or a combination thereof), registered trademarks, words "confidential" and "copy prohibited" indicating that it is confidential information, or similar words or patterns, and the like. In a copier job, image recognition such as OCR may be performed to determine whether the specific information is included.

As the next determination as to whether a function relating to security is set, the controller 101 determines whether a copier job relating to the test printing and the real printing has a specific setting relating to security enhancement (step S53). If the setting of the copier job does not include the specific setting relating to security enhancement (NO in the step S53), the routine proceeds to step S55 described later, and the notification regarding the end of the test printing is not performed. Meanwhile, if the setting of the copier job includes the specific setting relating to security enhancement (YES in the step S53), the routine proceeds to step S59, and the notification regarding the end of the test printing is performed.

Here, the specific setting relating to security enhancement is, for example, such that a secret information attribute is set to the image data and a document file or the like to be a target of a printer job held in the image memory 114. For image data, document files, and the like to which such an attribute is set, security may be further enhanced by requiring user authentication before selecting or printing. The above is the process of the notification determination relating to the end of the test printing.

Embodiment 2

In the embodiment 1, it has been described that the notifier 107 performs notification by means of at least one of the light of the LED 107b and the sound from the speaker 107c. As a more detailed aspect, the controller 101 may have variations in a length of a flashing cycle of light, a time ratio of turning light on and off, a color of light, and the like. Also with regard to sounds, variations may be given to a type of notification sound, a length of an on/off cycle of the notification sound, an on/off time ratio, a tone, and the like. Then, for example, the variation of the notification may be made different between the end of test printing and the end of real printing, in such a manner that the user can identify a type of notification.

Embodiment 3

In the embodiment 1, an aspect is described in which the end notification of the test printing and the copier job relating to the real printing is performed by light and sound in a model including the human body sensor 109. As a different aspect, as an alternative to or along with the notification, a notification may be sent via the communication interface circuit 55 to a mobile communication terminal (such as a smartphone) registered in advance by the user. For a printer job, an external device that has transmitted print data may be used as a destination, but as an alternative to or along with the destination, a notification may be sent via the communication interface circuit 55 to a mobile communication terminal (such as a smartphone) registered in advance by the user.

In execution of a copier job or a printer job, when a job is executed with the use of a user account, the user may register in advance a token, an e-mail address, or the like identifying a mobile communication terminal of a notification destination by linking to the user account. As a notification method, a notification mail may be requested to be delivered by a SMTP server via the communication interface circuit 55. Alternatively, a notification packet including notification content and a token identifying the user account or the mobile communication terminal may be transmitted to a relay server installed on a network, and the relay server having received the notification packet may request the SMTP server to deliver the notification e-mail, or may transmit a push notification to the mobile communication terminal. In addition, for a printer job, a notification packet including notification content is transmitted to an external device that has transmitted print data via the communication interface circuit 55, and the device having received the notification packet may display the notification content on the printer job operation screen 121 or the like. In this embodiment, it is necessary for the user to confirm the finish of the test printing, and therefore, the notification regarding the end of the test printing may be transmitted to a registered notification destination.

Embodiment 4

Figure 11:
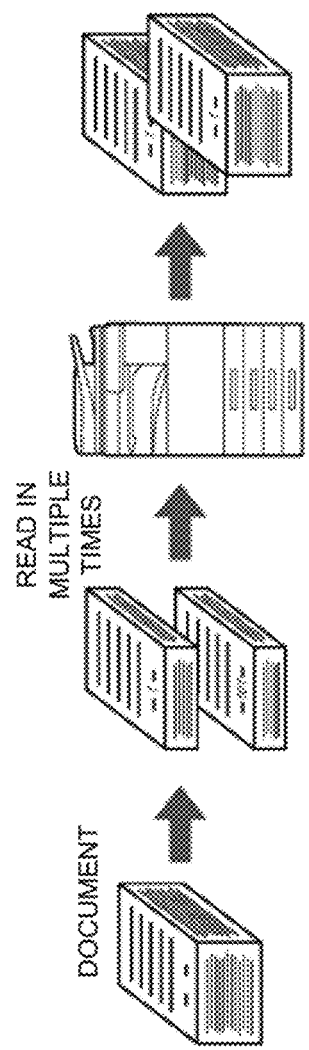
FIG. 11 is an explanatory diagram illustrating a flow of a copier job of a large-volume document reading function in this embodiment (embodiment 4).
Figure 12:
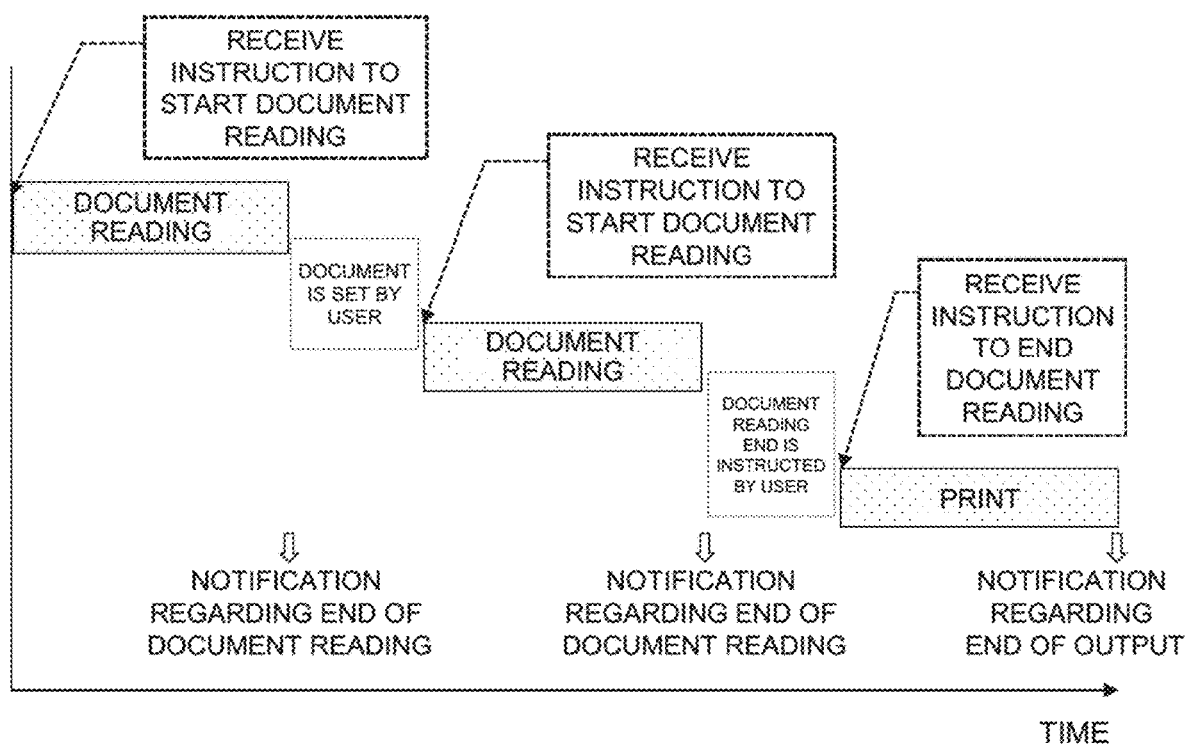
FIG. 12 is an explanatory diagram illustrating a configuration of a job of the large-volume document reading function in this embodiment (embodiment 4).

In this embodiment, one function is divided into a plurality of jobs and executed, and a large-volume document reading function will be described as an example of a function different from the test printing function. FIG. 11 is an explanatory diagram illustrating a flow of a copier job (large-volume document copying) using a large-volume document reading function as a specific example of a large-volume document reading function. FIG. 12 is an explanatory diagram illustrating a configuration of the copier job of the large-volume document reading function in this embodiment. As illustrated in FIG. 12, a large-volume document copying includes a document reading job relating to reading a document and a print job for outputting the read document, and each job starts to execute in response to a start instruction from the user. The selection of the large-volume document reading function is performed with the use of a function selection screen (not illustrated) that is displayed by the controller 101 when an "other function" is touched on the operation screen illustrated in FIG. 7.

A specific flow of the large-volume document copying will be described with reference to FIG. 11. The large-volume document copying is a function relating to a job for reading an image of a document with the use of the document conveyer 103. In addition to copier jobs, this function can also be selected for scanner jobs. In a scanner job, as an output mode, instead of the above-described print job, an image of a document read is held in the image memory 114 or transmitted to an external device via the communication interface circuit 55. There is an upper limit to the number of documents that can be set at one time on the document tray 103a of the document conveyer 103. If the number of documents exceeding the upper limit is set, there is a risk that the documents cannot be conveyed normally from the document tray 103a. In one example, the upper limit value is 100 sheets.

If the user wants to make a copy of a document that has one copy constituted by a number of sheets exceeding the upper limit, the user selects the large-volume document reading function and then divides the document into a plurality of bundles. One bundle of documents is equal to or less than the upper limit (see FIG. 11). The user sets each bundle on the document tray 103a and then performs document reading. Each time one bundle of document reading ends, the controller 101 displays a user interface (not illustrated) on the display device 105b to execute document reading of a next bundle, end document reading and start outputting (printing for a copier job), or wait for the users instruction. The user sets the next document bundle on the document tray 103a as long as the document bundle is remaining, and instructs to execute document reading of the next bundle.

The user repeats the operation until there is no remaining bundle of documents. The two "receive instruction to start document reading" illustrated in FIG. 12 represents that the user has instructed the document reading twice. When all the documents are read, the user instructs to end the document reading and start printing. In response to the instruction, the controller 101 starts a job relating to printing, and outputs, copies of the document read up to that time, for a set number of copies. The "receive instruction to start document reading" illustrated in FIG. 12 indicates that the user has instructed to end the document reading and start printing after the document has been read twice. As described above, the large-volume document copying is made up of one or more jobs relating to document reading and one job relating to printing, and each job is started on the basis of the user's instruction. While the copier job has been described as an example, the large-volume document reading function can be implemented in the same flow for a scanner job.

Figure 13:
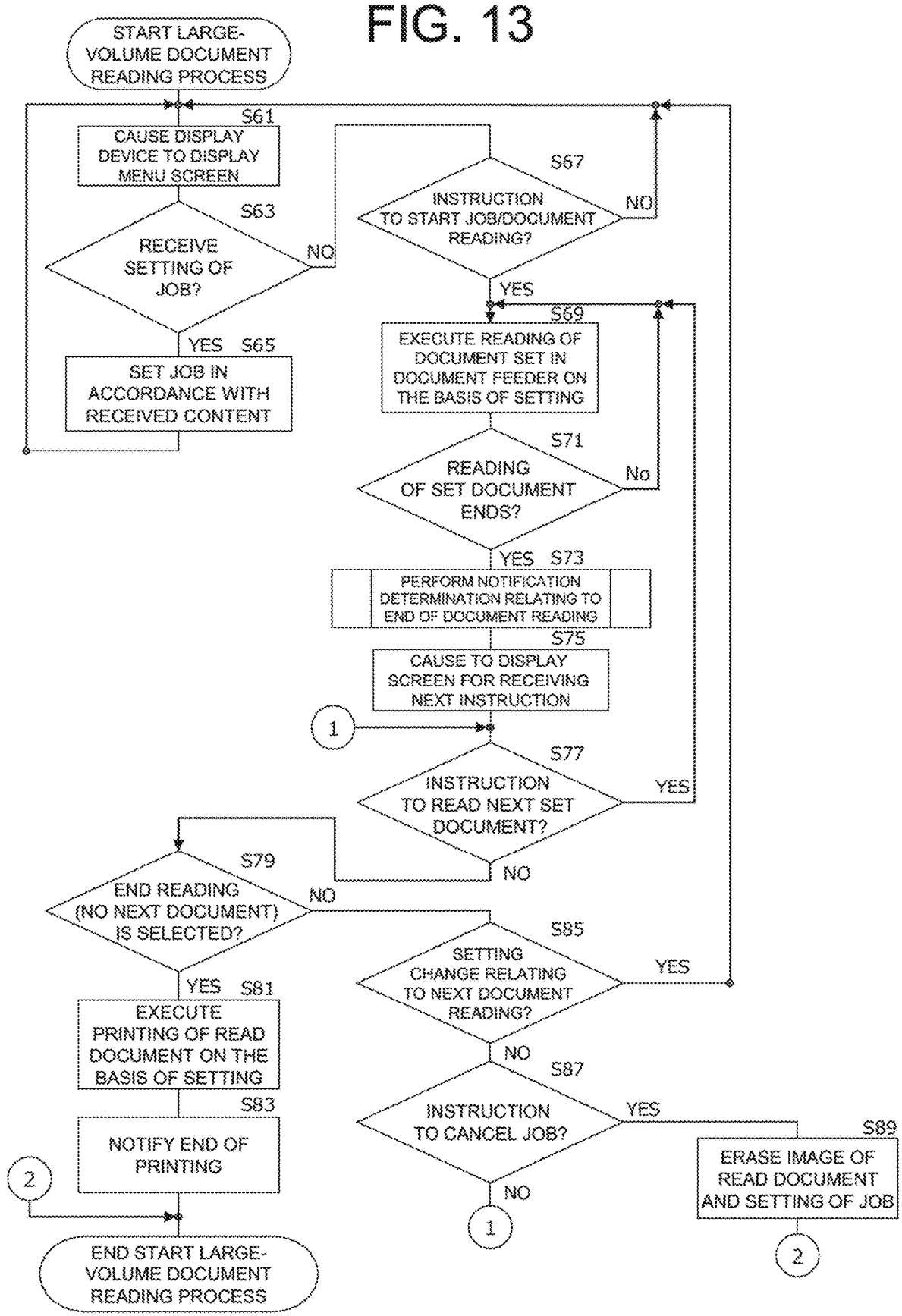
FIG. 13 is a flowchart illustrating a flow of the large-volume document reading function in this embodiment (embodiment 4).

Hereinafter, a flow of a job in which the large-volume document reading function is set will be described with the use of a flowchart. FIG. 13 is a flowchart illustrating a flow of a large-volume document reading process in this embodiment. Although a copier job is assumed, the flow is the same for a scanner job and thus could be easily analogized from FIG. 13 by a person skilled in the art. As illustrated in FIG. 13, the controller 101 causes the display device 105b to display the copier job operation screen 120 (step S61), and receives an operation by the user relating to a setting excluding the large-volume reading function of the copier job (step S63). Upon receipt of the operation of the setting excluding the large-volume reading function (YES in the step S63), the controller 101 updates the content of the setting relating to the copier job in accordance with the received operation (step S65). Then, the routine return to the process of the step S61.

On the copier job operation screen 120, the large-volume document reading function of the copier job is set, and then, when a touch operation on the "black/white start" button or the "color start" button is received (NO in the step S63 and YES in the step S67), the controller 101 executes a job relating to document reading in a mode according to the setting relating to the job (step S69). In accordance with which of the "black/white start" button and the "color start" button is touched, a bundle of documents set on the document tray 103a is read in a monochrome or a color mode and stored in the image memory 114.

When the copier job relating to reading the set document ends (NO in the step S71), the controller 101 performs notification determination relating to the end of the document reading (step S73), and uses the notifier 107 to determine whether to notify the end of the document reading. Although the content of the process relating to the notification determination in the step S73 will be described later, depending on the situation, there are cases where the end notification is performed or not performed. In this respect, the document reading differs from the real printing that uniformly performs the end notification. In addition, the controller 101 causes the display device 105*b* to display a user interface screen for receiving a next instruction (step S75).

Subsequently, the controller 101 waits for an instruction from the user using the user interface screen. If the instruction from the user is an instruction to read the next bundle of documents (YES in the step S77), the routine returns to the aforementioned step S69 described above, and the controller 101 executes a job relating to reading the next, bundle of documents set on the document tray 103*a* by the user. The loop of these processes is repeated until all the bundle of documents is read, that is, a loop from YES in the step S77 to the step S69, passing through the steps S71, S73 and S75, and to the step S77.

If the instruction from the user received in the step S75 is not an instruction to read the next bundle of documents (NO in the step S77) but an instruction that reading all the document bundles has ended (YES in the step S79), the controller 101 executes a job relating to printing of the document read in a mode according to the setting relating to the job (step S81). When the job relating to the printing ends, the controller 101 uses the notifier 107 to notify the end of the job relating to the printing (step S83), and ends a series of jobs relating to the large-volume document copying.

In the step S79, if the instruction from the user is not the instruction to end the document reading (NO in the step S79) but a setting change relating to the next document reading (YES in the step S85), the routine returns to the aforementioned step S61, and the controller 101 receives the change in a setting of the job. The setting changed here is reflected in the subsequent document reading, and after the setting change, in step S67, an instruction to read the next bundle of documents is waited.

In the step S85, if the instruction from the user is not the setting change relating to the next document reading (NO in the step S85), the controller 101 determines whether an instruction to cancel the job has been received (step S87). When an instruction to cancel the job has been received (YES in the step S87), the controller 101 erases the image of the read document and stored in the age memory 114 and the setting relating to the job (step S89), and ends the job of the large-volume document copying.

In the step S87, if the instruction from the user is not an instruction to cancel the job (NO in the step S87), the routine returns to the aforementioned step S77 and waits for an instruction from the user. Subsequently, the content of the notification determination process relating to the end of the document reading in the step S73 will be described. As a simple notification determination aspect, an aspect may be considered in which each time a job relating to document reading ends, notification regarding the end of the document reading is performed, and the user reliably sets the next document on the document tray or inputs an instruction to end the document reading, and in addition, notification regarding the end of printing is performed also for a job relating to printing. In addition, when the digital multifunction peripheral 100 includes the human body sensor 109, if the human body sensor 109 has not detected a person in surroundings at the end of document reading, notification regarding the end of the document reading is performed, and if a person has been detected, the notification may not be performed. In this embodiment, an aspect of making more complicated condition determination will be described.

Figure 14:
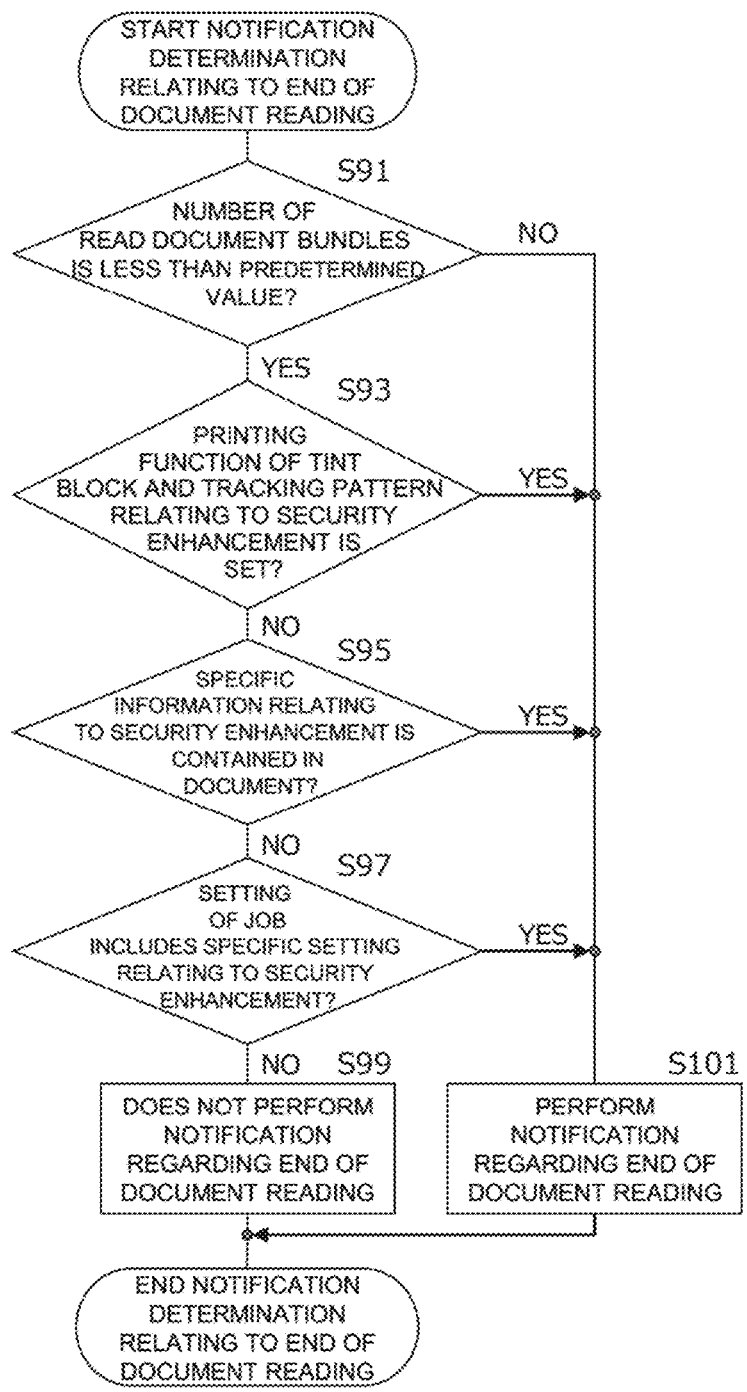
FIG. 14 is a flowchart illustrating a process relating to notification determination at the end of reading of a document set in a document tray in the flowchart of FIG. 13 (embodiment 4).

FIG. 14 is a flowchart illustrating a process relating to notification determination at the end of reading of a document set in a document tray. As illustrated in FIG. 14, the controller 101 determines whether the number of documents constituting the read document bundle is less than a predetermined threshold (step S91). This determination is performed after the reading of the set document ends, and thus the controller 101 knows the number of the read documents. In one example, an upper limit of the number of settable documents is 100, whereas the threshold is 10 sheets. When the number of read documents is equal to or more than the threshold (NO in the step S91), the controller 101 assumes that the time from the tart to end of a job relating to the document reading is long, and the user may leave the side of the operator 105, and performs notification regarding the end of the document reading (step S101).

Meanwhile, if the number of read documents is less than the threshold (YES in the step S91), the controller 101 assumes that the time from the start to end of a job relating to document reading is short and it is highly likely that the user is not away from the side of the operator 105, and basically does not perform notification regarding the end of the document reading. However, if a function relating to security is set, the end notification is performed with caution. For this determination, the routine proceeds to step S93 described later.

As a determination as to whether a function relating to security is set, the controller 101 first determines whether, for example, a function for superimposing a tint block, a tracking pattern, or a stamp pattern on an image of a document for printing to enhance document security is set (step S93). If a superimposed printing function for document security enhancement is not set (NO in the step S93), the routine proceeds to step S95 described later to determine whether another function relating to security is set. Meanwhile, if the superimposed printing function is set (YES in the step S93), the routine proceeds to step S101, and the notification regarding the end of the document reading is performed.

As the next determination as to whether a function relating to security is set, the controller 101 determines whether the document or print data contains specific information relating to document security enhancement (step S95). If specific information relating to document security enhancement is not contained (NO in the step S95), the routine proceeds to step S97 described later to determine whether another function relating to security is set. Meanwhile, if information for document security enhancement is set (YES in the step 95), the routine proceeds to step S101, and the notification regarding the end of the document reading is performed.

As the next determination as to whether a function relating to security is set, the controller 101 determines whether a copier job relating to the document reading and the printing has a specific setting relating to security enhancement (step S97). If the setting of the copier job does not include the specific setting relating to security enhancement (NO in the step S97), the routine proceeds to step S99 described later, and the notification regarding the end of the document reading is not performed. Meanwhile, if the setting of the copier job includes the specific setting relating to security enhancement (YES in the step S97), the routine proceeds to step S101, and the notification regarding the end of the document reading is performed. When the digital multi-function peripheral 100 includes the human body sensor 109, before the process of the step S99, the controller 101 checks whether the human body sensor 109 has detected a person in surroundings, and if detecting, the process proceeds to the process of the step S99 and the notification regarding the end of the document reading is not performed, but if a person has not been detected in the surroundings, the process may proceed to the process of the step S101 to perform the notification regarding the end of the document reading. The above is the process of the notification determination relating to the end of the document reading.

As mentioned above, (i) the image forming apparatus according to the present invention includes: an image processor that can at least execute either a printer job as a printer or a copier job as a copier; a setting receiver that receives a setting by a user of a test printing function for confirming a finish; a job controller that receives an execution request of a job relating to test printing of the printer job or the copier job and causes the image processor to execute test printing on a basis of the set test printing function, and further receives an execution request of a job relating to real printing and causes the image processor to execute real printing; a notifier that notifies the user of ends of the job relating to the test printing and the job relating to the real printing; and a notification controller that controls whether to cause the notifier to notify the end of the job relating to the test printing and the end of the job relating to the real printing respectively on the basis of at least one of the setting relating to the printer job or the copier job and an attribute of an image to be processed.

In the present invention, the image processor is hardware that performs a process relating to input/output of image data and software that controls the hardware, for example, hardware and software that read a document and store the image data in an image memory. In addition, the image processor is hardware and software that perform a process for developing print data received from an external device via, for example, a communication interface circuit and storing the developed data in the image memory. Moreover, the image processor is hardware and software that print and output the image data stored in the image memory. Furthermore, the image processor is hardware and software that convert the image data stored in the image memory into data of a predetermined format and output the data to an external device via, for example, the communication interface circuit.

A specific aspect of the image processor includes a scanning mechanism for scanning a document and a circuit for reading an image of the scanned document, which corresponds to the image reader 111 in the aforementioned embodiment. In addition, the aspect includes a circuit and software for processing the image of the read document or processing print data received from an external device, which corresponds to the image processing circuit in the above-described embodiment. Moreover, the aspect includes an image memory for storing at least one of the image of the read document, the received print data, and the processed image data. Furthermore, the aspect includes hardware and software for printing the image data, which corresponds to the image forming device that performs printing by an electrophotographic method in the aforementioned embodiment.

In addition, the job is a process executed in response to one execution request received from a user or an external device, and is a series of processes relating to image formation. The specific aspect thereof is, for example, a process relating to image formation as a scanner, a printer or a copier. Alternatively, a copier job or a printer job may be divided into a job relating to test printing and a job relating to real printing and executed as in the aforementioned embodiment, or a copier job or a printer job may be divided into a job relating to document reading and a job relating to outputting and executed.

Furthermore, the setting receiver receives a setting relating to the job. The setting relating to the job is, in one example, a setting relating to a number of copies, a color mode, a document, a sheet, a double-sided copy, a magnification, a copy density, finishing, other functions (including a large-volume document reading function), preview, test copy, and the like in the copier job operation screen illustrated in FIG. 7. In another example, the setting relating to the job is a setting relating to a number of copies, a document size, document orientation, double-sided printing, test printing, an output sheet size, zoom, page grouping, stapling, document filing, color mode, paper feeding, finishing, a layout, job handling, image quality (not illustrated) in the printer job operation screen illustrated in FIG. 8.

The specific aspect of the setting receiver corresponds to, for example, the operator or the communication interface circuit and the controller in the aforementioned embodiment, and hardware and software centering on a display device, an input device, a communication interface circuit and a CPU are combined organically to implement the function of the setting receiver.

The job execution request is an instruction to start the job execution. As a specific example, the job execution request corresponds to a touch operation on the "test copy" button, a touch operation on the preview button (which triggers a job to read a document, store same in the image memory, and display a preview image on the display device 105*b*), a touch operation on the black and white start button or a touch operation on the color start button in the copier job operation screen illustrated in FIG. 7. In another example, the job execution request corresponds to a click on the OK button in the printer job operation screen illustrated in FIG. 8.

In addition, the job controller operates the g processor or the like to execute the job on the basis of a setting relating to the job. The specific aspect thereof corresponds to, for example, the controller in the aforementioned embodiment, and hardware and software centering on a CPU are combined organically to implement the function of the job controller. Furthermore, the notifier notifies the user of the completion of the job. The specific aspect thereof is, for example, notification by light, sound, or communication, and corresponds to the light emission of the LED, the sound from a speaker, and notification by communication via the communication interface in the aforementioned embodiment.

In the present invention, the attribute of the image relates particularly to whether the image contains information related to document security. The specific aspect thereof is, for example, an attribute as to whether the image contains information relating to an address, a phone number, an e-mail address, a date of birth, or a combination of them, a registered trademark, words "confidential" and "copy prohibited" indicating that it is confidential information or similar words or patterns, and the like. Furthermore, the notification controller determines whether to perform notification regarding the end of a job on the basis of a setting relating to the job and the attribute of the image. The specific aspect thereof corresponds to, for example, the controller in the aforementioned embodiment, and hardware and software centering on a CPU are combined organically to implement the function of the notification controller.

Furthermore, a preferred aspect of the present invention will be described. (ii) The notification controller may not notify the end of the job relating to the test printing but may notify the end of the job relating to the real printing on the basis of a fact that the test printing function is set. Since the number of copies and the number of printed sheets for test printing is smaller compared to real printing, the job ends in a shorter period, and it is highly likely that the user does not leave the side of the operator 105 in order to confirm the finish of the test printing. Meanwhile, the number of copies and the number of printed sheets for real printing is larger and requires longer time compared to the test printing. According to this aspect, it is possible to suppress the notification regarding the end of the test printing that is likely to be unnecessary for the user, and to provide the notification regarding the real printing that the user is likely to need.

(iii) The notification controller may not notify the end of the job relating to the real printing number of copies or the number of printed sheets of the job relating to the real printing is less than a predetermined value, and may notify the end of the job relating to the real printing if the number is greater than or equal to the value. According to this aspect, if the number of copies or the number of printed sheets of the real printing is less than the aforementioned predetermined value, it is assumed that the time required for the real printing is short and it is highly likely that the user does not leave the side of the operator 105, and the notification regarding the end of the real printing is suppressed. Meanwhile, if the number of copies or the number of printed sheets of the real printing is equal to or more than the aforementioned predetermined value, it is assumed that the time required for the real printing is long and the user may leave the side of the operator 105, and the notification regarding the end of the real printing is performed.

(iv) A human body sensor that detects a person in surroundings is further included, and on the basis of whether the human body sensor has detected a person when the test printing ends, when not detecting the person, the notification controller may notify the end of the job relating to the test printing, and when detecting the person, may not notify the end of the job relating to the test printing. In this way, when the test printing ends, if there is a person, that is, the user, in a sensing area of the human body sensor, the notification regarding the end of the test printing can be suppressed, and if there is no person in the sensing area, the notification can be performed.

(v) The setting receiver further receives a setting of an information addition function for adding and outputting specific information specified by the user, and when the test printing function and the information addition function are set, the notification controller may notify the end of the job relating to the test printing on the basis of a fact that the both functions are set. In this way, when an information addition function that is considered to be highly likely to be used for printing a highly confidential documents set, notification regarding the end of the test printing is performed on the basis of a fact that the information addition function is set, thereby enabling the user to quickly collect an output, and it is possible to reduce the possibility that the print output can be seen by others.

(vi) When the image relating to printing has confidentiality, the notification controller may notify the end of the job relating to the test printing on the basis of a fact that the image has confidentiality. In this way, on the basis of the fact that the image relating to printing has confidentiality; notification regarding the end of the test printing is performed, thereby enabling the user to quickly collect an output, and it is possible to reduce the possibility that the print output can be seen by others.

(vii) In addition, the image forming apparatus according to the present invention includes; an image processor that can execute at least either a scanner job as a scanner or a copier job; a document conveyer for sequentially feeding each document in such a manner that the image processor reads a plurality of documents set by a user; a setting receiver that receives a setting by a user of a large-volume document reading function that treats, documents set in the document conveyer in multiple times and read by the image processor, as one volume of documents and collectively outputs the documents; a job controller that receives an execution request of a job relating to document reading of each time, causes the document conveyer to feed the set documents, causes the image processor to read the fed documents, and further receives an execution request of a job relating to an output, and collectively outputs the documents read in multiple times; a notifier that notifies the user of ends of the job relating to the document reading and the job relating to the output; and a notification controller that controls whether to cause the notifier to notify the end of the job relating to the document reading of each time and the end of the job relating to the output on the basis of at least one of the setting relating to a job including the large-volume document reading function and an attribute of an image to be processed. Furthermore, a preferred aspect of the present invention will be described.

(viii) The notification controller may notify both the end of the job relating to the document reading of each time and the end of the job relating to the output on the basis of a fact that the large-volume document reading function is set. According to this aspect, in each time of document reading in the large-volume document reading function, it is highly likely that the number of documents close to an upper limit value that can be set in the document tray is read, and the user is supposed to leave the side of the operator 105 by the end of the document reading, and the notification regarding the end of the document reading of each time is performed. In addition, even for a job relating to the output of a large number of read documents, it is assumed that it takes time to end the job and that the user is supposed to leave the side of the operator 105, and the notification regarding the end of the output is performed.

(ix) In the job relating to the document reading of each time, the notification controller may not notify the end of the job relating to the document reading of a current time if a number of the read documents less than a predetermined value, and may notify the end of the job relating to the document reading of the current time if the number is greater than or equal to the value. For example, in a job in which a large-volume document reading function is set, the number of documents in the last bundle among the documents divided into a plurality of bundles may be much smaller than the aforementioned upper limit value. Also with regard to the other bundles, it cannot be said that there is no possibility that a small number of sheets can be combined into one bundle when documents are divided into a plurality of bundles by the user's hand. According to this aspect, when the number of read documents is small and the document reading ends in a short time, it is highly likely that the user is not away from the side of the operator 105, and the notification regarding the end of the document reading of that time can be suppressed.

(x) An image forming apparatus including the above according to the present invention includes: an image processor that executes a job of at least one type of scan, print, and copy; a setting receiver that receives a setting relating to the job by a user; a job controller that receives an execution request relating to a plurality of jobs of a same type or different types predetermined for execution of a job relating to one function d causes the image processor to execute the job relating to the one function; a notifier that notifies the user of an end of each of the plurality of jobs; and a notification controller that determines whether to cause the notifier to notify the end of each of the plurality of jobs on the basis of at least one of a setting relating to each of the plurality of jobs and an attribute of an image to be processed.

The preferred aspects of the present invention also include combinations of any of the above-described plurality of aspects. In addition to the aforementioned embodiments, there can be various modifications of the present invention. Those variations should not be construed as not to fall within the scope of the present invention. The present invention should include the meanings equivalent to the scope of the claims and all the modifications within the scope.

What is claimed is:

1. An image forming apparatus comprising: an image processor that executes a job of at least one type of scan, print, and copy;
    a setting receiver that receives a setting relating to the job by a user;
    a job controller that receives an execution request relating to a plurality of jobs of a same type or different types predetermined for execution of a job relating to one function and causes the image processor to execute the job relating to the one function;
    a notifier that notifies the user of an end of each of the plurality of jobs; and
    a notification controller that determines whether to cause the notifier to notify the end of each of the plurality of jobs on a basis of at least one of a setting relating to each of the plurality of jobs or whether the job processes an image or a print data that contains information relating to document security or has a secret attribute.

2. The image forming apparatus according to claim 1, wherein the image processor can at least execute, as the job, either a printer job or a copier job,
    wherein the setting receiver receives, as the setting, a setting related to a test printing function for confirming a finish,
    wherein the job controller receives an execution request of a job relating to test printing of the printer job or the copier job and causes the image processor to execute test printing on a basis of the set test printing function, and further receives an execution request of a job relating to real printing and causes the image processor to execute real printing,
    wherein the notifier notifies the user of ends of a job relating to test printing and a job relating to real printing, and
    wherein the notification controller controls whether to cause the notifier to notify the end of the job relating to the test printing and the end of the job relating to the real printing respectively on a basis of at least one of a setting relating to the printer job or whether the job processes the image or the print data that contains information relating to document security or has the secret attribute.

3. The image forming apparatus according to claim 2, wherein the notification controller does not notify the end of the job relating to the test printing but notifies the end of the job relating to the real printing on a basis of a fact that the test printing function is set.

4. The image forming apparatus according to claim 2, wherein the notification controller does not notify the end of the job relating to the real printing if a number of copies or a number of printed sheets of the job relating to the real printing is less than a predetermined value, and notifies the end of the job relating to the real printing if the number is greater than or equal to the predetermined value.

5. The image forming apparatus according to claim 2, further comprising a human body sensor that detects a person in surroundings, wherein, on a basis of whether the human body sensor detects a person when the test printing ends, the notification controller notifies the end of the job relating to the test printing when not detecting the person, and does not notify the end of the job relating to the test printing when detecting the person.

6. The image forming apparatus according to claim 1, the image processor capable of executing, as the job, at least either a scanner job or a copier job, and the image forming apparatus comprising a document conveyer for sequentially feeding each document in such a manner that the image processor reads a plurality of documents set by a user,
    wherein the setting receiver receives, as the setting, a setting related to a large-volume document reading function that treats, documents set in the document conveyer in multiple times, as one volume of documents and collectively outputs the documents,
    wherein the job controller receives an execution request of a job relating to document reading of each time, causes the document conveyer to feed the set documents, causes the image processor to read the fed documents, and further receives an execution request of a job relating to an output, and collectively outputs the documents read in multiple times,
    wherein the notifier notifies the user of ends of the job relating to the document reading and the job relating to the output, and
    wherein the notification controller controls whether to cause the notifier to notify the end of the job relating to the document reading of each time and the end of the job relating to the output on a basis of at least one of the setting relating to a job or whether the job processes the image or the print data that contains information relating to document security or has the secret attribute.

7. The image forming apparatus according to claim 6, wherein the notification controller notifies both the end of the job relating to the document reading of each time and the end of the job relating to the output on a basis of whether the job processes the image or the print data that contains information relating to document security or has the secret attribute.

8. The image forming apparatus according to claim 6, wherein, in the job relating to the document reading of each time, the notification controller does not notify the end of the job relating to the document reading if a number of the read documents is less than a predetermined value, and notifies the end of the job relating to the document reading if the number is greater than or equal to the predetermined value.

9. A control method of an image forming apparatus including a computer controlling an image processor, the computer comprising:
    receiving a setting by a user relating to a job of at least one type of scan, print, and copy;
    receiving an execution request relating to a plurality of jobs of a same type or different types predetermined for execution of a job relating to one function and causing the image processor to execute the job relating to the one function; and determining whether to notify the user of an end of each of the plurality of jobs on a basis of at least one of a setting relating to each of the plurality of jobs and an attribute of an image to be processed or whether the job processes the image or the print data that contains information relating to document security or has the secret attribute.

10. The control method of an image forming apparatus according to claim 9, the control method comprising:

receiving, as the setting, a setting by a user of a test printing function for confirming a finish;

receiving an execution request of a job relating to test printing of a printer job or a copier job and causing the image processor to execute the test printing on a basis of the set test printing function;

receiving an execution request of a job relating to real printing and causing the image processor to execute real printing; and determining whether to respectively notify the user of an end of the job relating to the test printing and an end of the job relating to the real printing on a basis of at least one of a setting relating to the printer job or whether the job processes the image or the print data that contains information relating to document security or has the secret attribute.

11. The control method of an image forming apparatus according to claim 9, the control method comprising:

receiving, as the setting, a setting by a user of a large-volume document reading function that treats, documents set in a document conveyer in multiple times and read by the image processor, as one volume of documents and collectively outputs the documents;

receiving an execution request of a job relating to document reading of each time, causing the document conveyer to feed the set documents, and causing the image processor to read the fed documents;

receiving an execution request of a job relating to an output and collectively outputting the documents read in multiple times; and determining whether to notify the user of the end of the job relating to the document reading of each time and the end of the job relating to the output on a basis of at least one of the setting relating to a job or whether the job processes the image or the print data that contains information relating to document security or has the secret attribute.

* * * * *